United States Patent
Funabashi et al.

(10) Patent No.: US 10,659,304 B2
(45) Date of Patent: May 19, 2020

(54) METHOD OF ALLOCATING PROCESSES ON NODE DEVICES, APPARATUS, AND STORAGE MEDIUM

(71) Applicant: FUJITSU LIMITED, Kawasaki-shi, Kanagawa (JP)

(72) Inventors: Ryoichi Funabashi, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 661 days.

(21) Appl. No.: 15/158,701

(22) Filed: May 19, 2016

(65) Prior Publication Data
US 2017/0005946 A1    Jan. 5, 2017

(30) Foreign Application Priority Data
Jul. 2, 2015 (JP) ................................ 2015-133869

(51) Int. Cl.
*H04L 12/24* (2006.01)
*H04L 29/08* (2006.01)
(Continued)

(52) U.S. Cl.
CPC ........ *H04L 41/0896* (2013.01); *G06F 9/5066* (2013.01); *H04L 67/10* (2013.01); *H04L 67/34* (2013.01)

(58) Field of Classification Search
CPC ..... H04L 47/125; H04L 47/805; H04L 65/60; H04L 5/0075; H04L 43/08; H04L 67/10;
(Continued)

(56) References Cited

U.S. PATENT DOCUMENTS

| 8,843,929 B1 * | 9/2014 | Oppenheimer ....... G06F 9/5044 718/102 |
| 2001/0003831 A1 * | 6/2001 | Boland ................. G06F 9/5016 709/226 |

(Continued)

FOREIGN PATENT DOCUMENTS

| JP | 2003-6172 | 1/2003 |
| JP | 2006-14981 | 1/2006 |

(Continued)

OTHER PUBLICATIONS

Singh et al.; Improve Resource Utilization by Task Scheduling in Cluster Computing; Feb. 2014; International Journal of Emerging Research in Management & Technology; ISSN: 2278-9359 (vol. 3, Issue-2); pp. 87-91 (Year: 2014).*

(Continued)

*Primary Examiner* — Backhean Tiv
*Assistant Examiner* — Linh T. Nguyen
(74) *Attorney, Agent, or Firm* — Fujitsu Patent Center

(57) ABSTRACT

A method of allocating a plurality of processes on a plurality of node devices coupled through a network, includes: dividing the plurality of processes into one or more process groups including at least one process among the plurality of processes, based on a bandwidth desired for data communication between processes in the plurality of processes; specifying, for each of the one or more process groups, a node device which is able to perform entirety of processes included in the process group among the plurality of node devices; and allocating the process group on the specified node device, for each of the one or more process groups.

19 Claims, 26 Drawing Sheets

(51) Int. Cl.
*G06F 9/50* (2006.01)
*G06F 9/48* (2006.01)

(58) Field of Classification Search
CPC . H04W 36/00; H04W 72/1268; G06F 9/5038;
G06F 9/5066; G06F 9/50; G06F 9/5016;
G06F 2209/5017; G06F 9/5061; G06F
9/5027; G06F 9/5072; G06F 9/5088;
G06F 9/4881; G06F 2209/503; G06F
9/505; G06F 9/5055
USPC ............ 709/226, 224, 202, 201; 370/395.41,
370/468; 455/452.1; 718/100, 102, 104
See application file for complete search history.

(56) References Cited

U.S. PATENT DOCUMENTS

| | | | | |
|---|---|---|---|---|
| 2004/0184406 | A1* | 9/2004 | Iwamura | H04B 3/54 370/235 |
| 2004/0194089 | A1* | 9/2004 | McCarthy | G06F 9/5011 718/100 |
| 2010/0153965 | A1* | 6/2010 | Arimilli | G06F 9/4856 718/105 |
| 2010/0318650 | A1* | 12/2010 | Nielsen | G06F 15/17 709/224 |
| 2011/0064079 | A1* | 3/2011 | Lim | H04L 12/185 370/390 |
| 2011/0307903 | A1* | 12/2011 | Vaddagiri | G06F 9/5088 718/105 |
| 2011/0314225 | A1* | 12/2011 | Nishihara | G06F 9/5088 711/119 |
| 2014/0033220 | A1* | 1/2014 | Campbell | G06F 9/5083 718/104 |
| 2014/0237069 | A1* | 8/2014 | Gray | G06F 3/061 709/214 |
| 2014/0298350 | A1* | 10/2014 | Kimata | G06F 9/5027 718/104 |
| 2015/0128148 | A1 | 5/2015 | Miyashita et al. | |
| 2017/0255496 | A1* | 9/2017 | Deng | G06F 9/4881 |
| 2018/0081581 | A1* | 3/2018 | Tomiyama | G06F 3/06 |

FOREIGN PATENT DOCUMENTS

| | | |
|---|---|---|
| JP | 2006-268166 | 10/2006 |
| JP | 2015-88112 | 5/2015 |

OTHER PUBLICATIONS

Shigeki Fukuta et al., "Proposal of the scalable method of following to environmental changes for automatic wide area process distribution", Multimedia, Distributed, Cooperative, and Mobile (DICOMO2014) symposium, Jul. 2014, pp. 674-682 (16 pages with partial English translation).

JPOA—Office Action of Japanese Patent Application No. 2015-133869 dated Jan. 8, 2019 with Full Machine translation.

* cited by examiner

| PROCESS NAME | AMOUNT OF NECESSITY CALCULATION | OUTPUT SIDE NECESSITY BANDWIDTH |
|---|---|---|
| START | - | 10 |
| PROCESS 1 | 2 | 1 |
| PROCESS 2 | 2 | 2 |
| PROCESS 3 | 3 | 10 |
| END | - | - |

| NODE NAME | CALCULATION RESOURCE | COUPLING LINK |
|---|---|---|
| NODE 1 | 5 | LINK 1 |
| HUB 1 | 0 | LINK 1 , LINK 2 |
| HUB 2 | 0 | LINK 2 , LINK 3 , LINK 4 |
| NODE 2 | 1 | LINK 3 |
| NODE 3 | 4 | LINK 4 |

| LINK NAME | COMMUNICATION COST |
|---|---|
| LINK 1 | 1 |
| LINK 2 | 10 |
| LINK 3 | 1 |
| LINK 4 | 1 |

FIG. 6A

| NODE NAME | CALCULATION RESOURCE | ALLOCATED PROCESS | REMAINING CALCULATION RESOURCE |
|---|---|---|---|
| NODE 1 | 5 | – | 5 |
| NODE 2 | 1 | – | 1 |
| NODE 3 | 4 | – | 4 |

FIG. 6B

| PROCESS NAME | ALLOCATION NODE |
|---|---|
| START | – |
| PROCESS 1 | – |
| PROCESS 2 | – |
| PROCESS 3 | – |
| END | – |

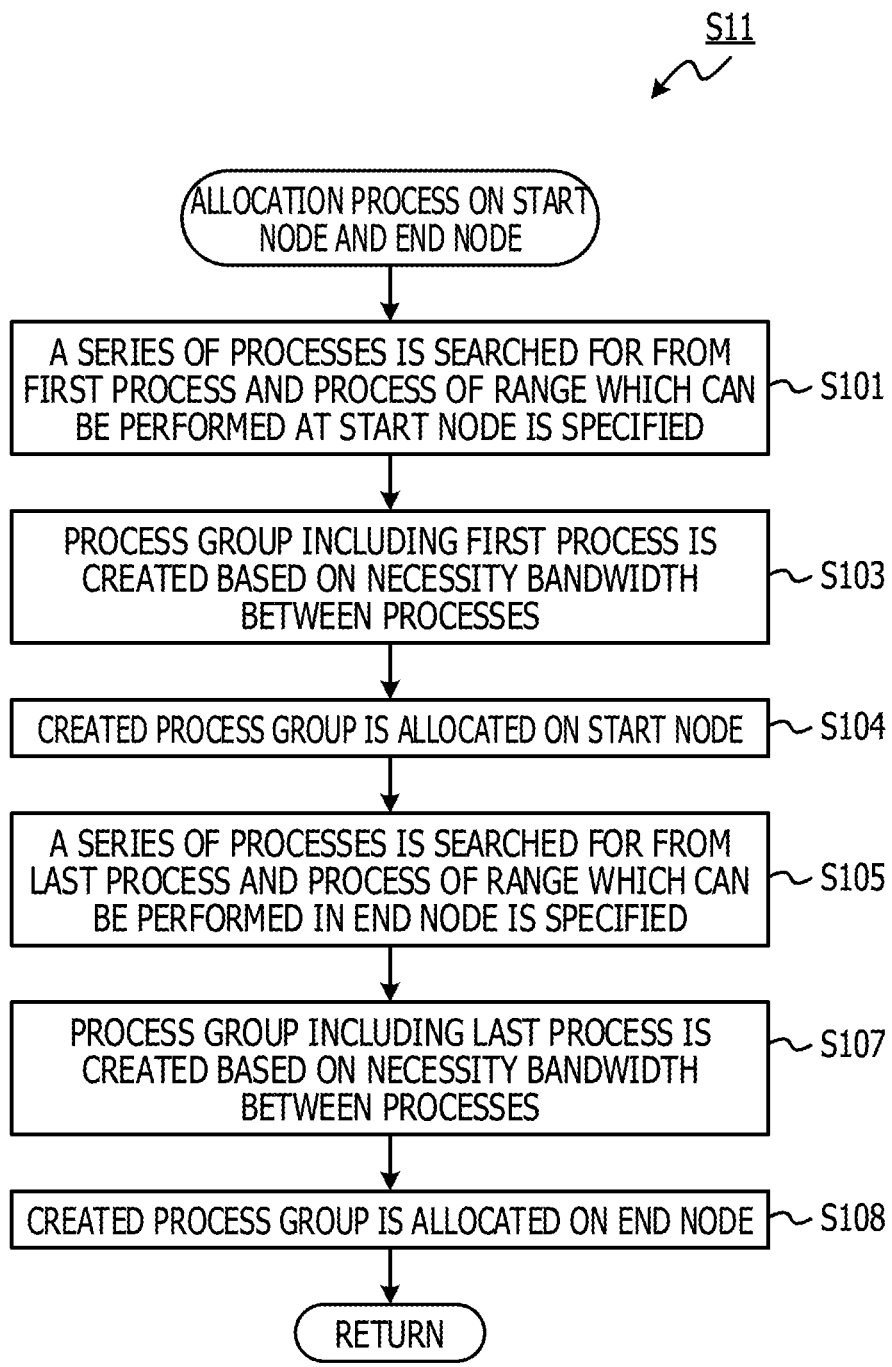

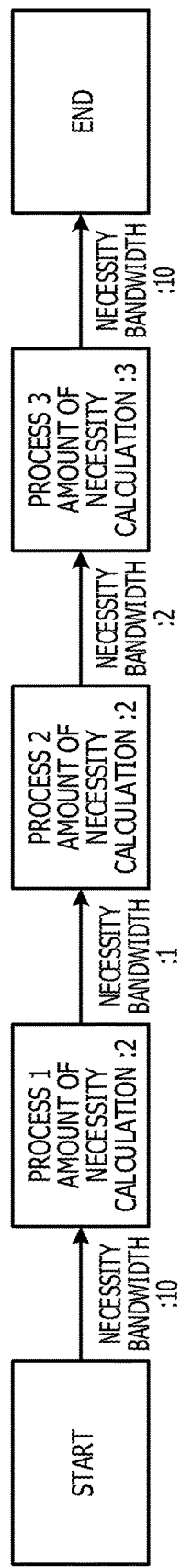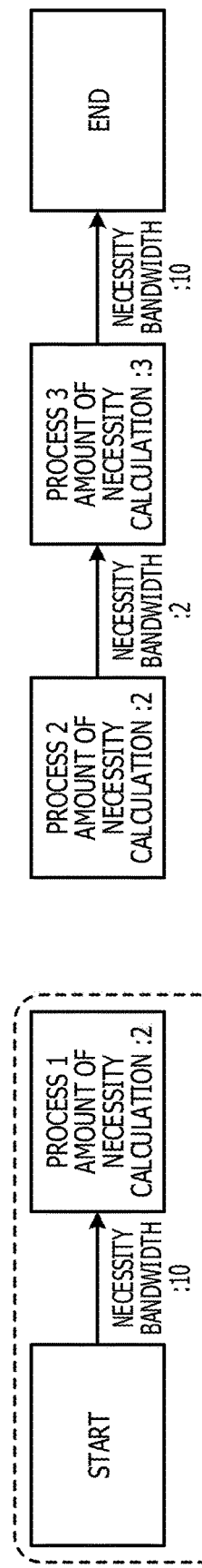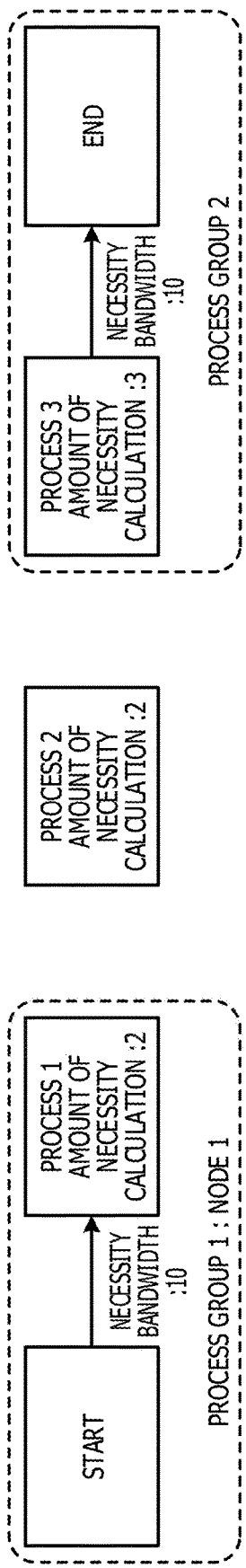

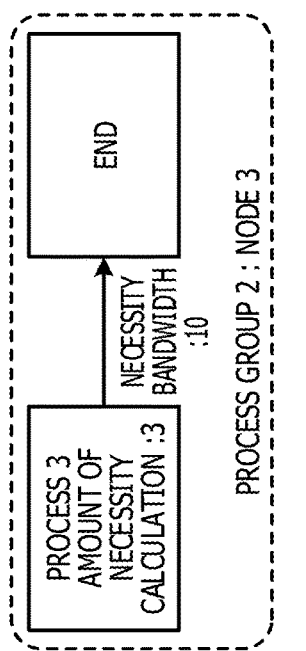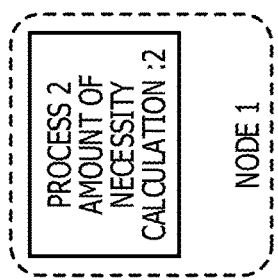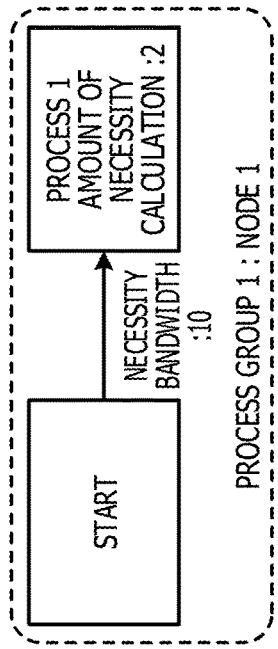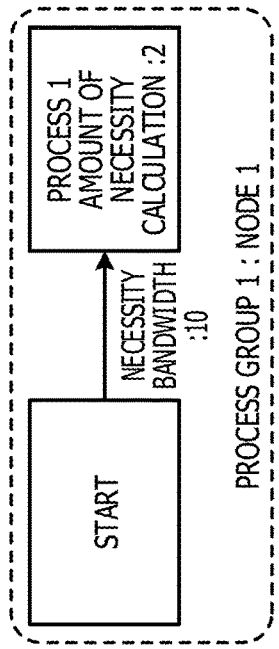
FIG. 9E
FIG. 9F

FIG. 10A

| PROCESS GROUP | PROCESS NAME | ALLOCATION NODE |
|---|---|---|
| PROCESS GROUP 1 | START , PROCESS 1 | − |

FIG. 10B

| PROCESS GROUP | PROCESS NAME | ALLOCATION NODE |
|---|---|---|
| PROCESS GROUP 1 | START , PROCESS 1 | NODE 1 |

FIG. 10C

| NODE NAME | CALCULATION RESOURCE | ALLOCATED PROCESS | REMAINING CALCULATION RESOURCE |
|---|---|---|---|
| NODE 1 | 5 | START , PROCESS 1 | 3 |
| NODE 2 | 1 | − | 1 |
| NODE 3 | 4 | − | 4 |

FIG. 10D

| PROCESS NAME | ALLOCATION NODE |
|---|---|
| START | NODE 1 |
| PROCESS 1 | NODE 1 |
| PROCESS 2 | − |
| PROCESS 3 | − |
| END | − |

FIG. 11A

| PROCESS GROUP | PROCESS NAME | ALLOCATION NODE |
|---|---|---|
| PROCESS GROUP 1 | START , PROCESS 1 | NODE 1 |
| PROCESS GROUP 2 | PROCESS 3 , END | – |

FIG. 11B

| PROCESS GROUP | PROCESS NAME | ALLOCATION NODE |
|---|---|---|
| PROCESS GROUP 1 | START , PROCESS 1 | NODE 1 |
| PROCESS GROUP 2 | PROCESS 3 , END | NODE 3 |

FIG. 11C

| NODE NAME | CALCULATION RESOURCE | ALLOCATED PROCESS | REMAINING CALCULATION RESOURCE |
|---|---|---|---|
| NODE 1 | 5 | START , PROCESS 1 | 3 |
| NODE 2 | 1 | – | 1 |
| NODE 3 | 4 | PROCESS 3 , END | 1 |

FIG. 11D

| PROCESS NAME | ALLOCATION NODE |
|---|---|
| START | NODE 1 |
| PROCESS 1 | NODE 1 |
| PROCESS 2 | – |
| PROCESS 3 | NODE 3 |
| END | NODE 3 |

FIG. 12A

| NODE NAME | CALCULATION RESOURCE | ALLOCATED PROCESS | REMAINING CALCULATION RESOURCE |
|---|---|---|---|
| NODE 1 | 5 | START , PROCESS 1 , PROCESS 2 | 1 |
| NODE 2 | 1 | – | 1 |
| NODE 3 | 4 | PROCESS 3 , END | 1 |

FIG. 12B

| PROCESS NAME | ALLOCATION NODE |
|---|---|
| START | NODE 1 |
| PROCESS 1 | NODE 1 |
| PROCESS 2 | NODE 1 |
| PROCESS 3 | NODE 3 |
| END | NODE 3 |

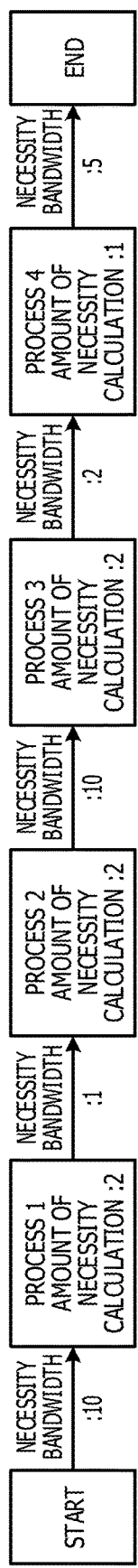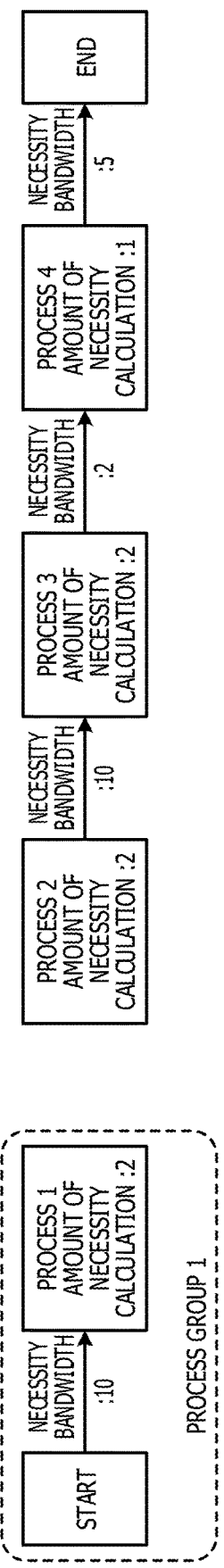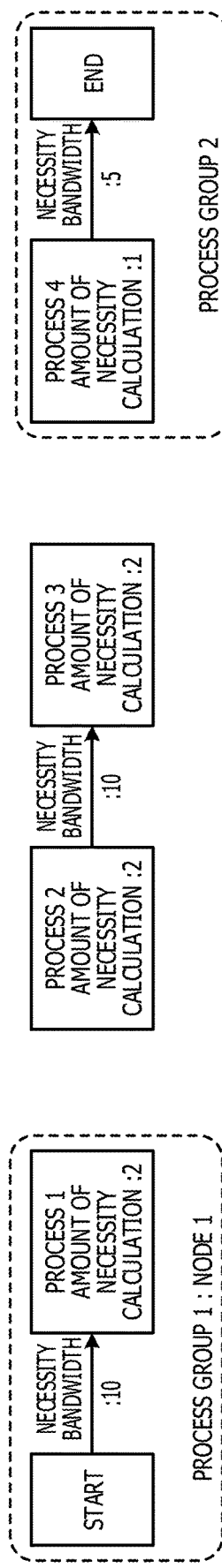

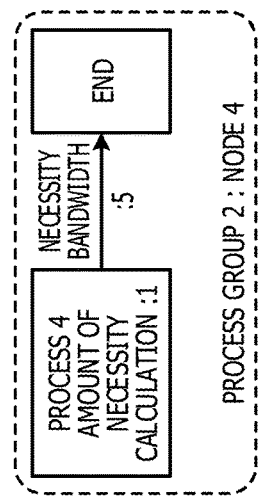
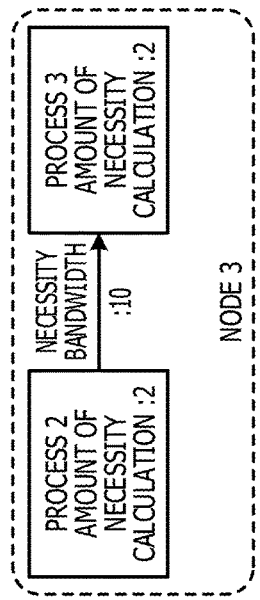
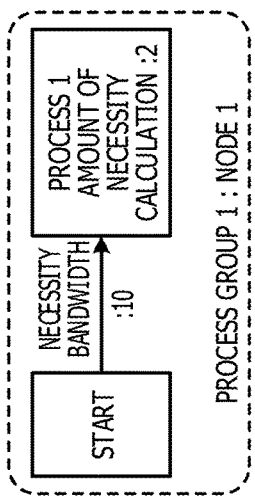
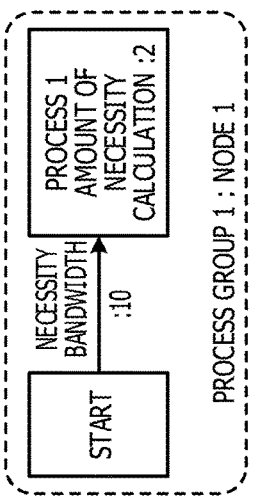

FIG. 14

| NODE NAME | CALCULATION RESOURCE | ALLOCATED PROCESS | REMAINING CALCULATION RESOURCE |
|---|---|---|---|
| NODE 1 | 3 | START, PROCESS 1 | 1 |
| NODE 2 | 4 | – | 4 |
| NODE 3 | 4 | – | 4 |
| NODE 4 | 2 | PROCESS 3, END | 1 |

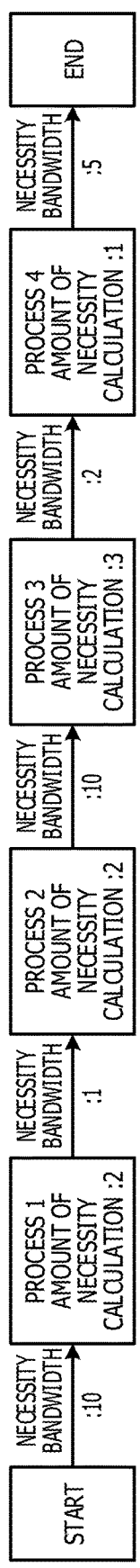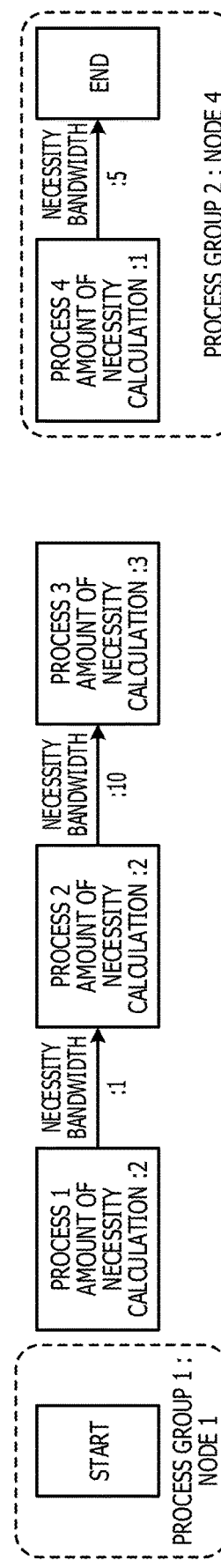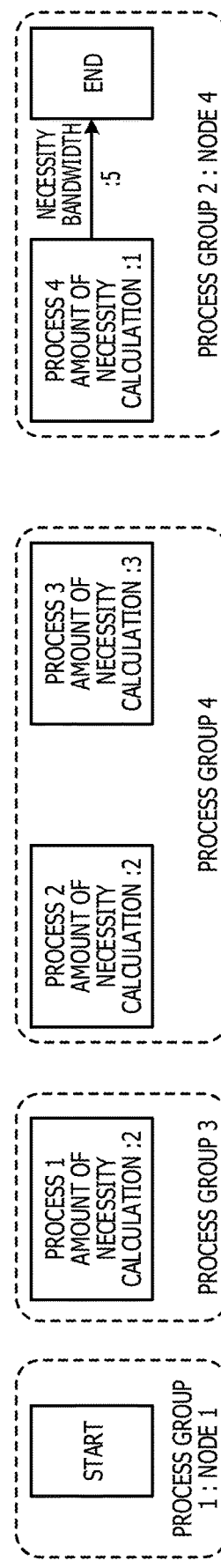

FIG. 17A

| NODE NAME | CALCULATION RESOURCE | ALLOCATED PROCESS | REMAINING CALCULATION RESOURCE |
|---|---|---|---|
| NODE 1 | 1 | START | 1 |
| NODE 2 | 4 | – | 4 |
| NODE 3 | 4 | – | 4 |
| NODE 4 | 2 | PROCESS 4 , END | 1 |

FIG. 17B

| PROCESS GROUP | PROCESS NAME | ALLOCATION NODE |
|---|---|---|
| PROCESS GROUP 1 | START | NODE 1 |
| PROCESS GROUP 2 | PROCESS 4 , END | NODE 4 |

FIG. 17C

| PROCESS GROUP | PROCESS NAME | ALLOCATION NODE |
|---|---|---|
| PROCESS GROUP 1 | START | NODE 1 |
| PROCESS GROUP 2 | PROCESS 4 , END | NODE 4 |
| PROCESS GROUP 3 | PROCESS 1 | – |
| PROCESS GROUP 4 | PROCESS 2 , PROCESS 3 | – |

FIG. 18A

| PROCESS GROUP | PROCESS NAME | ALLOCATION NODE |
|---|---|---|
| PROCESS GROUP 1 | START | NODE 1 |
| PROCESS GROUP 2 | PROCESS 4 , END | NODE 4 |
| PROCESS GROUP 3 | PROCESS 1 | NODE 2 |
| PROCESS GROUP 4 | PROCESS 2 , PROCESS 3 | – |

FIG. 18B

| NODE NAME | CALCULATION RESOURCE | ALLOCATED PROCESS | REMAINING CALCULATION RESOURCE |
|---|---|---|---|
| NODE 1 | 1 | START | 1 |
| NODE 2 | 4 | PROCESS 1 | 2 |
| NODE 3 | 4 | – | 4 |
| NODE 4 | 2 | PROCESS 4 , END | 1 |

FIG. 18C

| PROCESS GROUP | PROCESS NAME | ALLOCATION NODE |
|---|---|---|
| PROCESS GROUP 1 | START | NODE 1 |
| PROCESS GROUP 2 | PROCESS 4 , END | NODE 4 |
| PROCESS GROUP 3 | PROCESS 1 | NODE 2 |
| PROCESS GROUP 4-1 | PROCESS 2 | – |
| PROCESS GROUP 4-2 | PROCESS 3 | – |

METHOD OF ALLOCATING PROCESSES ON NODE DEVICES, APPARATUS, AND STORAGE MEDIUM

CROSS-REFERENCE TO RELATED APPLICATION

This application is based upon and claims the benefit of priority of the prior Japanese Patent Application No. 2015-133869, filed on Jul. 2, 2015, the entire contents of which are incorporated herein by reference.

FIELD

The embodiment discussed herein is related to a method of allocating processes on node devices, an apparatus, and a storage medium.

BACKGROUND

In the related art, a series of processes is performed in a distributed manner in a plurality of information processing devices (hereinafter, described as node). By the distributed performance, it is possible to perform a series of processes which may not be performed in one node, or reduce a performance time desired for performing a series of processes in one node. In addition, since a start node and an end node are fixed in the performance of a series of processes, there is a case where the series of processes is performed in a distributed manner in a plurality of nodes.

In a case where a series of processes is performed in a distributed manner, each process is allocated on a node on a network. In a stream data process configured from a plurality of associated processes, it is known that each process is allocated on a node on the shortest path between the start node and the end node.

As examples of the related art, Japanese Laid-open Patent Publication No. 2006-14981, and Shigeki Fukuta et al., "Proposal of the scalable method of following to environmental changes for automatic wide area process distribution", Multimedia, Distributed, Cooperative, and Mobile (DICOMO2014) symposium, 674, July 2014 are known.

SUMMARY

According to an aspect of the invention, a method of allocating a plurality of processes on a plurality of node devices coupled through a network, the method includes: dividing, by a processor, the plurality of processes into one or more process groups including at least one process among the plurality of processes, based on a bandwidth desired for data communication between processes in the plurality of processes; specifying, for each of the one or more process groups, a node device which is able to perform entirety of processes included in the process group among the plurality of node devices; and allocating the process group on the specified node device, for each of the one or more process groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A illustrates a data configuration of a resource allocation management table;

FIG. 6B illustrates a data configuration of a node allocation information table;

FIG. 8 is a flow chart illustrating the details of the allocation process on a start node and an end node;

FIGS. 9A, 9B, 9C, 9D, 9E, and 9F are diagrams for explaining the allocation process;

FIGS. 10A, 10B, 10C, 10D, 11A, 11B, 11C, and 11D are diagrams for explaining the allocation process on the start node and the end node;

FIGS. 12A, 12B, 13A, 13B, 13C, 13D, 13E, 13F, and 14 are diagrams for explaining step S14 of the allocation process;

FIGS. 16A, 16B, 16C, 16D, 16E, 16F, 17A, 17B, 17C, 18A, 18B, and 18C are diagrams for explaining the node determination process;

DESCRIPTION OF EMBODIMENT

In the related art, since the amount of data to be exchanged between two consecutive processes is not sufficiently considered, there is a possibility that each process is not allocated on an appropriate node. Then, a network load at the time of distribution performance may increase.

In one aspect, the embodiment is to provide technology for reducing a network load when a series of processes is performed in a distributed manner in a plurality of nodes.

Hereinafter, an embodiment of a distributed process system will be described in detail based on FIG. 1 to FIG. 18C.

Figure 1:
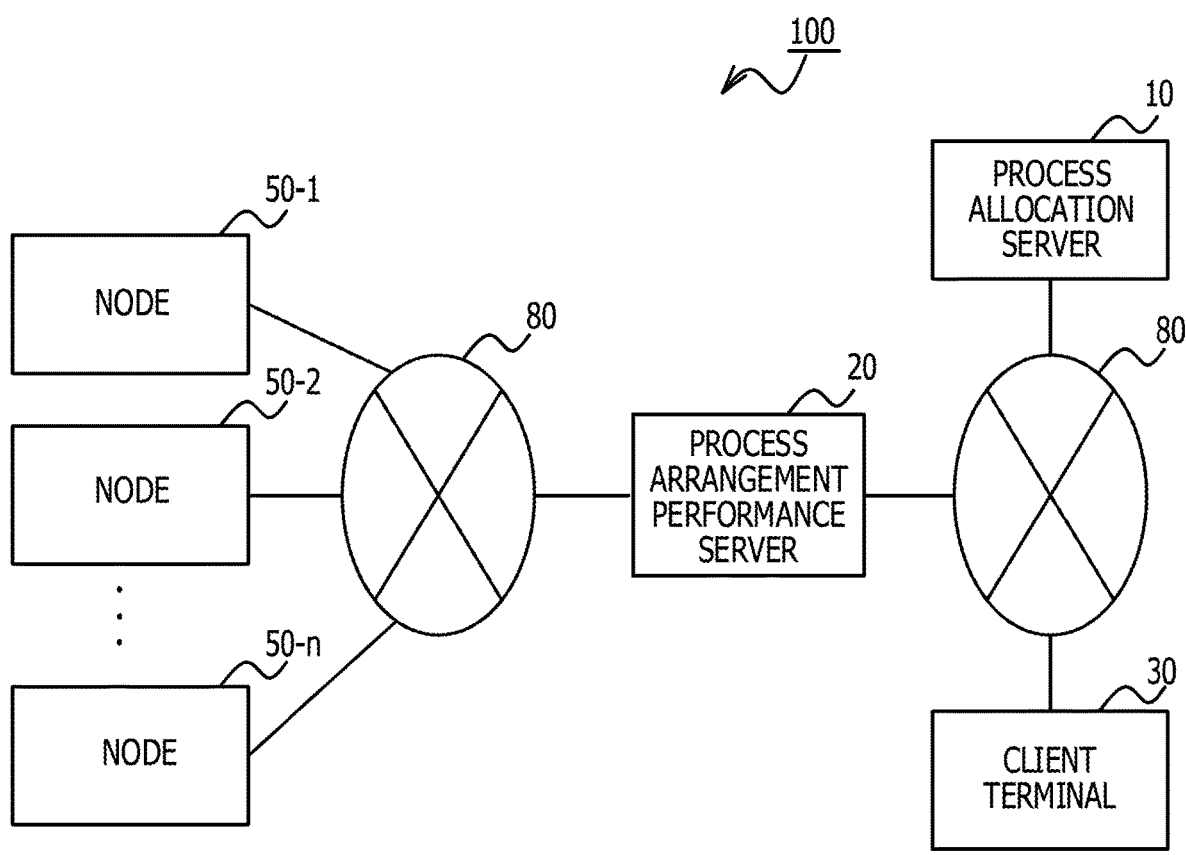
FIG. 1 illustrates a configuration of a distributed process system according to an embodiment.

FIG. 1 illustrates a configuration of a distributed process system 100 according to an embodiment. The distributed process system 100 includes a process allocation server 10, a process arrangement performance server 20, a client terminal 30, and a plurality of nodes 50-1 to 50-n. The client terminal 30, the process arrangement performance server 20, the process allocation server 10, and the nodes 50-1 to 50-n are coupled to one another through a wired or wireless network 80 such as the Internet, a local area network (LAN), a wide area network (WAN), and the like.

In the distributed process system 100, the client terminal 30 requests the performance of a series of processes including a plurality of associated processes to the process arrangement performance server 20. For example, the client terminal 30 extracts only facial images from captured images captured by a digital camera or the like, and requests the performance of a series of processes for collating the extracted facial images with facial images registered in a database to the process arrangement performance server 20. The series of processes includes a plurality of associated processes such as encoding and decoding of the captured image, the extraction of the facial image, the compression of the facial image, the collation of the facial image, and the like. The process arrangement performance server 20 requests allocation of each process on the nodes 50-1 to 50-*n* to the process allocation server 10 in order to perform a series of processes in a the distributed manner on the nodes 50-1 to 50-*n* on the network 80 when receiving a performance request of a series of processes from the client terminal 30. The process allocation server 10 determines a node on which each process included in a series of processes is allocated from a plurality of the nodes 50-1 to 50-*n*, when receiving an allocation request from the process arrangement performance server 20, and transmits an allocation result of each process on the nodes 50-1 to 50-*n* to the process arrangement performance server 20. The process arrangement performance server 20 that has received the allocation result from the process allocation server 10 arranges and performs each process in the nodes 50-1 to 50-*n*. The nodes 50-1 to 50-*n* perform a process allocated by the process arrangement performance server 20, and transmit a performance result to the client terminal 30.

Figure 2:
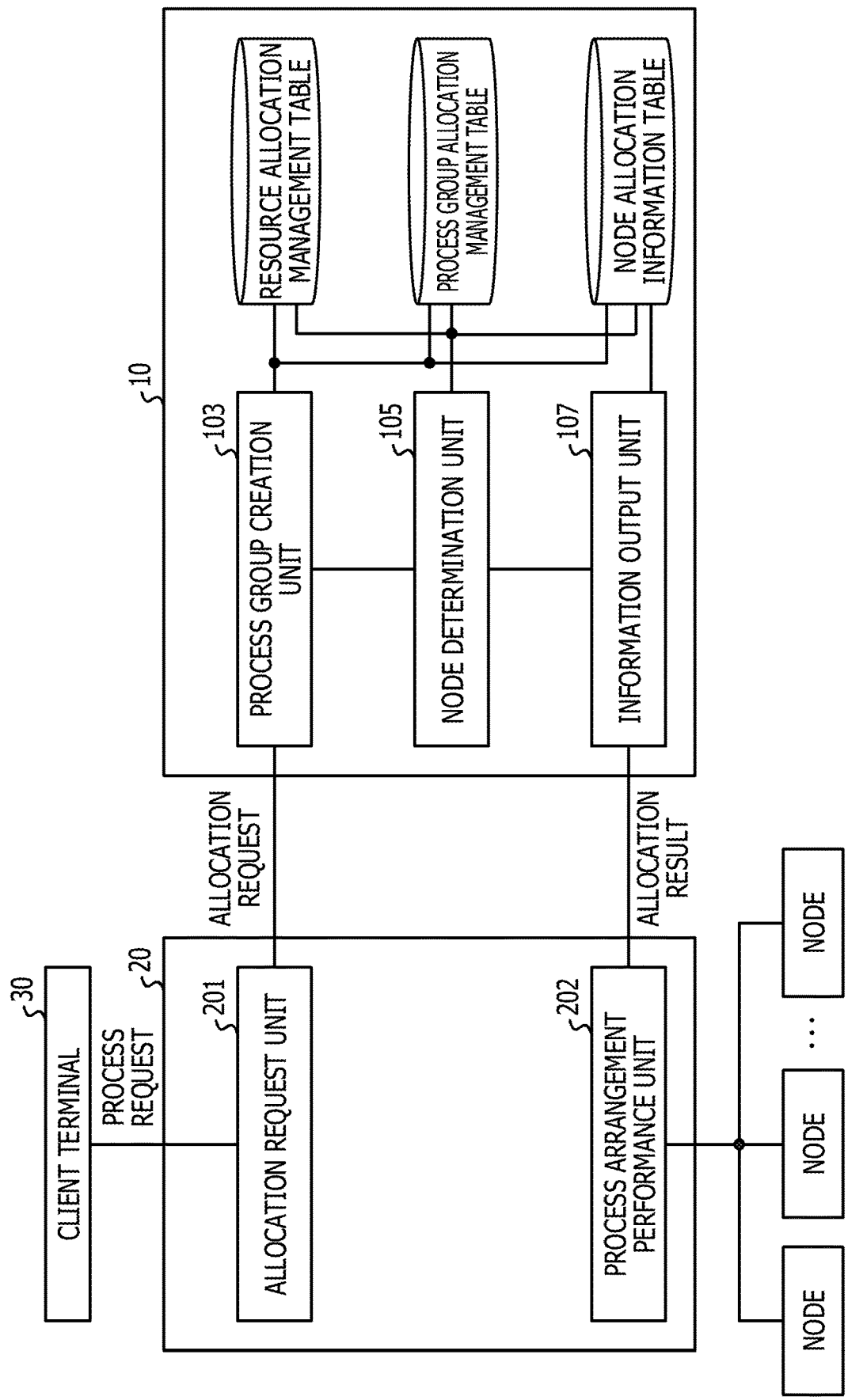
FIG. 2 is a functional block diagram of a process arrangement performance server and a process allocation server.
Figure 3A:
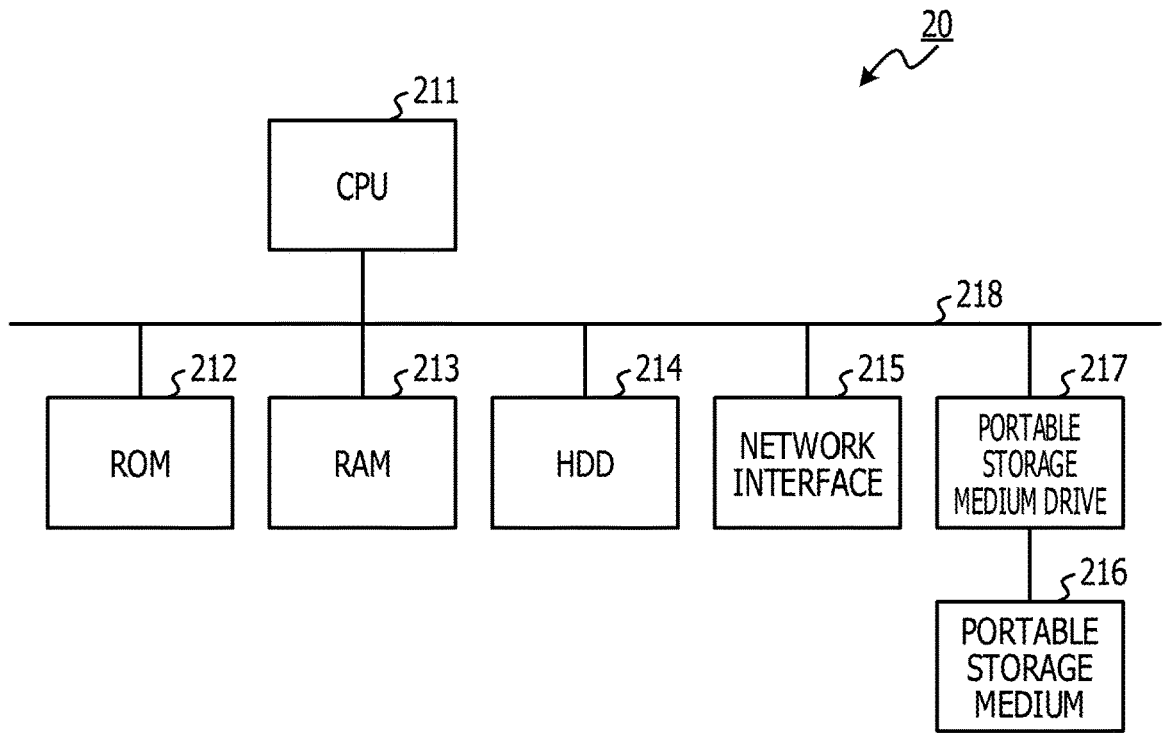
FIG. 3A illustrates an example of a hardware configuration of the process arrangement performance server.
Figure 3B:
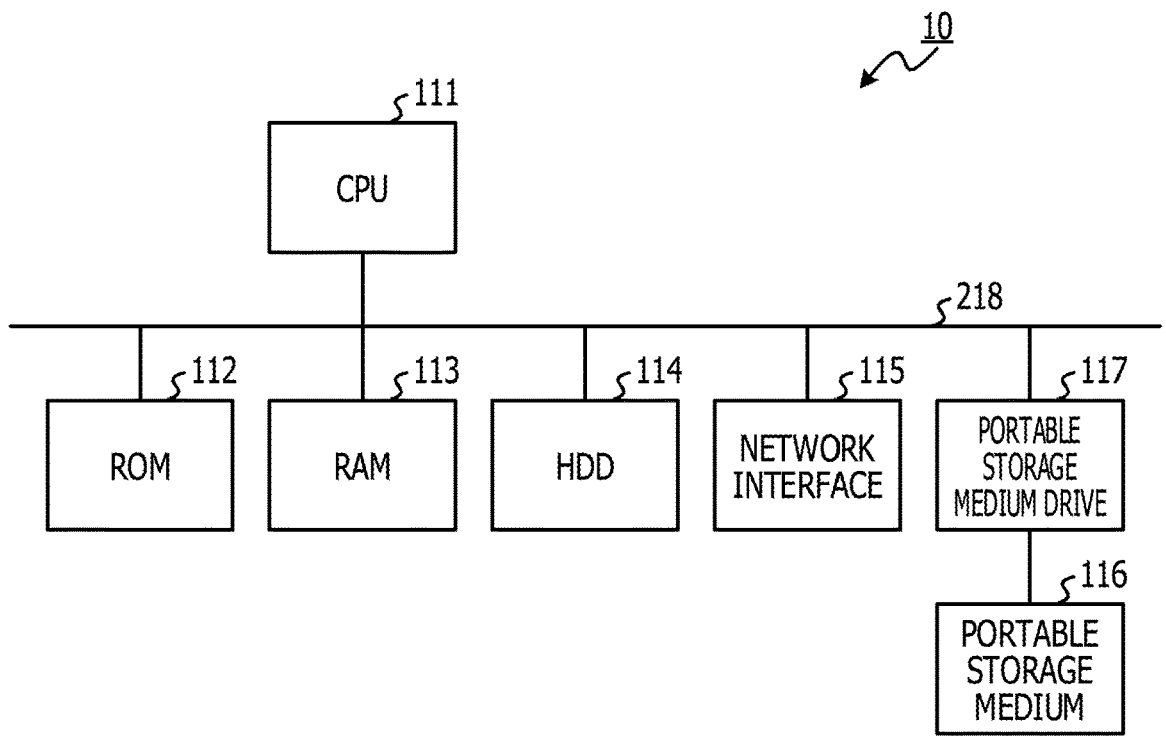
FIG. 3B illustrates an example of a hardware configuration of the process allocation server.

FIG. 2 illustrates a functional block diagram of the process arrangement performance server 20 and the process allocation server 10. FIG. 3A illustrates an example of a hardware configuration of the process arrangement performance server. FIG. 3B illustrates an example of a hardware configuration of the process allocation server.

The process arrangement performance server 20 includes an allocation request unit 201 and a process arrangement performance unit 202. The process arrangement performance server 20 includes a hardware configuration as illustrated in FIG. 3A. For example, as illustrated in FIG. 3A, the process arrangement performance server 20 includes a central process unit (CPU) 211, a read only memory (ROM) 212, a random access memory (RAM) 213, a storage device (HDD: hard disk drive) 214, a network interface circuit 215, a portable storage medium drive 217 capable of reading data stored in a portable storage medium 216, or the like. Respective units of the process arrangement performance server 20 are coupled to one another by a bus 218. The CPU 211 causes the process arrangement performance server 20 to function as each unit of FIG. 2 by executing a program stored in the ROM 212 or the HDD 214, or a program read by the portable storage medium drive 217 from the portable storage medium 216.

Back to the description of FIG. 2. The allocation request unit 201 receives the performance request of a series of processes including a plurality of associated processes from the client terminal 30. The allocation request unit 201 that has received the performance request transmits information relating to the series of processes (hereinafter, described as series process configuration information) to the process allocation server 10, and requests allocation of each process on a node included in the series of processes. In addition, the allocation request unit 201 transmits configuration information in a network for distributing and performing a series of processes (hereinafter, described as network configuration information) and information relating to a communication cost in the network (hereinafter, described as communication cost information) to the process allocation server 10. Furthermore, the allocation request unit 201 transmits information of a start node and an end node to the process allocation server 10 in a case where a node for starting a series of processes (start node) and a node for ending a series of processes (end node) are determined in advance.

The process arrangement performance unit 202 receives an allocation result of each process on nodes from the process allocation server 10, arranges each process included in a series of processes in each node, and performs the process, based on the allocation result.

Figures 4A, 4B:
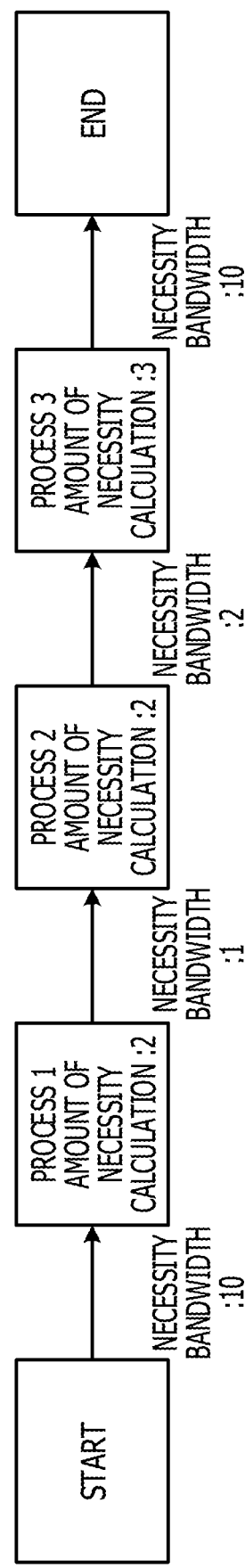
FIG. 4A illustrates an example of series process configuration information.
FIG. 4B schematically illustrates a series of processes.

Here, the series process configuration information, the network configuration information, and the communication cost information will be described in detail. FIG. 4A illustrates an example of the series process configuration information. FIG. 4B schematically illustrates a series of processes.

First, the series process configuration information will be described based on FIG. 4A. The series process configuration information, as illustrated in FIG. 4A, includes fields such as a "process name", a "necessity calculation amount", and an "output side necessity bandwidth". The name of the process included in a series of processes is stored in the field of "process name". The information of the amount of calculation desired for performing each process is stored in the field of "necessity calculation amount". Information of a bandwidth desired for data communication between a process and a process immediately after the process is stored in the field of "output side necessity bandwidth". FIG. 4B schematically represents a series of processes based on the series process configuration information of FIG. 4A.

Figures 5A, 5B, 5C:
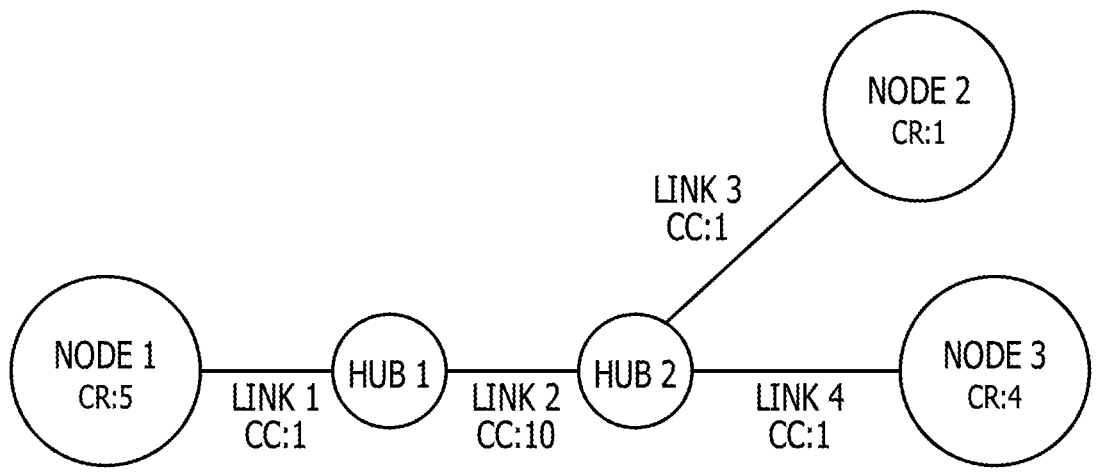
FIG. 5A illustrates an example of network configuration information.
FIG. 5B illustrates an example of communication cost information.
FIG. 5C schematically illustrates a network configuration.

Next, the network configuration information and the communication cost information are respectively described based on FIG. 5A and FIG. 5B. FIG. 5A illustrates an example of the network configuration information. FIG. 5B illustrates an example of the communication cost information. FIG. 5C schematically illustrates a network configuration. The network configuration information, as illustrated in FIG. 5A, includes fields such as a "node name", a "calculation resource", and a "coupling link". The name of a node existing on a network is stored in the field of "node name". Information of the amount of calculation which can be performed in each node is stored in the field of "calculation resource". Information (name of link in FIG. 5A) of a link coupled to each node is stored in the field of "coupling link".

As illustrated in FIG. 5B, the communication cost information includes fields such as "name of link", and "communication cost". The name of a link existing on a network is stored in the field of "name of link". Information of the communication cost in a case of communicating through a link is stored in the field of "communication cost". FIG. 5C schematically represents a network based on the network configuration information of FIG. 5A and the communication cost information of FIG. 5B. In FIG. 5C and subsequent drawings, "CR" represents a calculation resource, and "CC" represents a communication cost.

Back to the description of FIG. 2. The process allocation server 10 includes a process group creation unit 103, a node determination unit 105, and an information output unit 107. The process allocation server 10 includes a hardware configuration as illustrated in FIG. 3B. For example, the process allocation server 10, as illustrated in FIG. 3B, includes a CPU 111, a ROM 112, a RAM 113, a storage device (HDD) 114, a network interface circuit 115, a portable storage medium drive 117 capable of reading data stored in a portable storage medium 116, or the like. Respective units of the process allocation server 10 are coupled to one another by a bus 118. The CPU 111 causes the process allocation server 10 to function as each unit of FIG. 2 by executing a program (including process allocation program) stored in the ROM 112 or the HDD 114, or a program (including process allocation program) read by the portable storage medium drive 117 from the portable storage medium 116.

Back to the description of FIG. 2. The process group creation unit 103 receives a request for allocating each process included in a series of processes on a node, from the process arrangement performance server 20. In addition, the process group creation unit 103 receives the series process configuration information (FIG. 4A), the network configuration information (FIG. 5A), and the communication cost information (FIG. 5B) from the process arrangement performance server 20. In addition, the process group creation unit 103 receives the information of a start node and an end node from the process arrangement performance server 20.

In the embodiment, the process group creation unit 103 creates a resource allocation management table based on the received network configuration information (FIG. 5A). FIG. 6A illustrates a data configuration of the resource allocation management table. FIG. 6B illustrates a data configuration of the node allocation information table. The resource allocation management table is a table for managing an allocation situation of a calculation resource on each node. For example, as illustrated in FIG. 6A, the resource allocation management table includes fields such as a "node name", a "calculation resource", an "allocated process", and a "remaining calculation resource". The name of a node is stored in the field of "node name". The information of the amount of calculation which can be performed on the node is stored in the field of "calculation resource". The information of a process allocated on a node is stored in the field of "allocated process". A value obtained by subtracting the amount of necessity calculation for the allocated process from the calculation resource of a node is stored in the field of "remaining calculation resource". That is, the information of the remaining amount of calculation which can be performed on an allocated node is stored in the field of "remaining calculation resource".

In addition, the process group creation unit 103 creates the node allocation information table based on the received series process configuration information. The node allocation information table is a table for managing the information of a node on which each process is allocated. For example, as illustrated in FIG. 6B, the node allocation information table includes fields such as a "process name", and an "allocation node". The name of a process included in a series of processes is stored in the field of "process name". The information of a node on which each process is allocated is stored in the field of "allocation node".

Back to the description of FIG. 2. The process group creation unit 103 divides a series of processes based on a bandwidth desired for data communication between processes (hereinafter, described as necessity bandwidth), and creates a process group including one or more processes. In the embodiment, the process group creation unit 103 divides a series of processes between processes between which a necessity bandwidth between processes is minimized, and creates a process group. The process group creation unit 103 creates a process group allocation management table (see FIG. 10A) for managing allocation of a process group on a node when creating the process group. The details of the process group allocation management table will be described below. The bandwidth desired for data communication between processes is a bandwidth desired for data communication between nodes for performing each process in a case where two successive processes are allocated on different nodes.

The node determination unit 105, for example, searches a node capable of performing the entirety of processes included in the process group from a plurality of nodes on the network, and determines a node on which the process group is allocated, with reference to the resource allocation management table (see FIG. 6A). The node determination unit 105 allocates the process included in the process group on the determined node.

The information output unit 107 transmits an allocation result (for example, node allocation information table) of each process on the node to the process arrangement performance server 20.

Hereinafter, processes performed in the process allocation server 10 will be described in detail according to flow charts of FIGS. 7, 8, and 15 appropriately with reference to other drawings.

Figure 7:
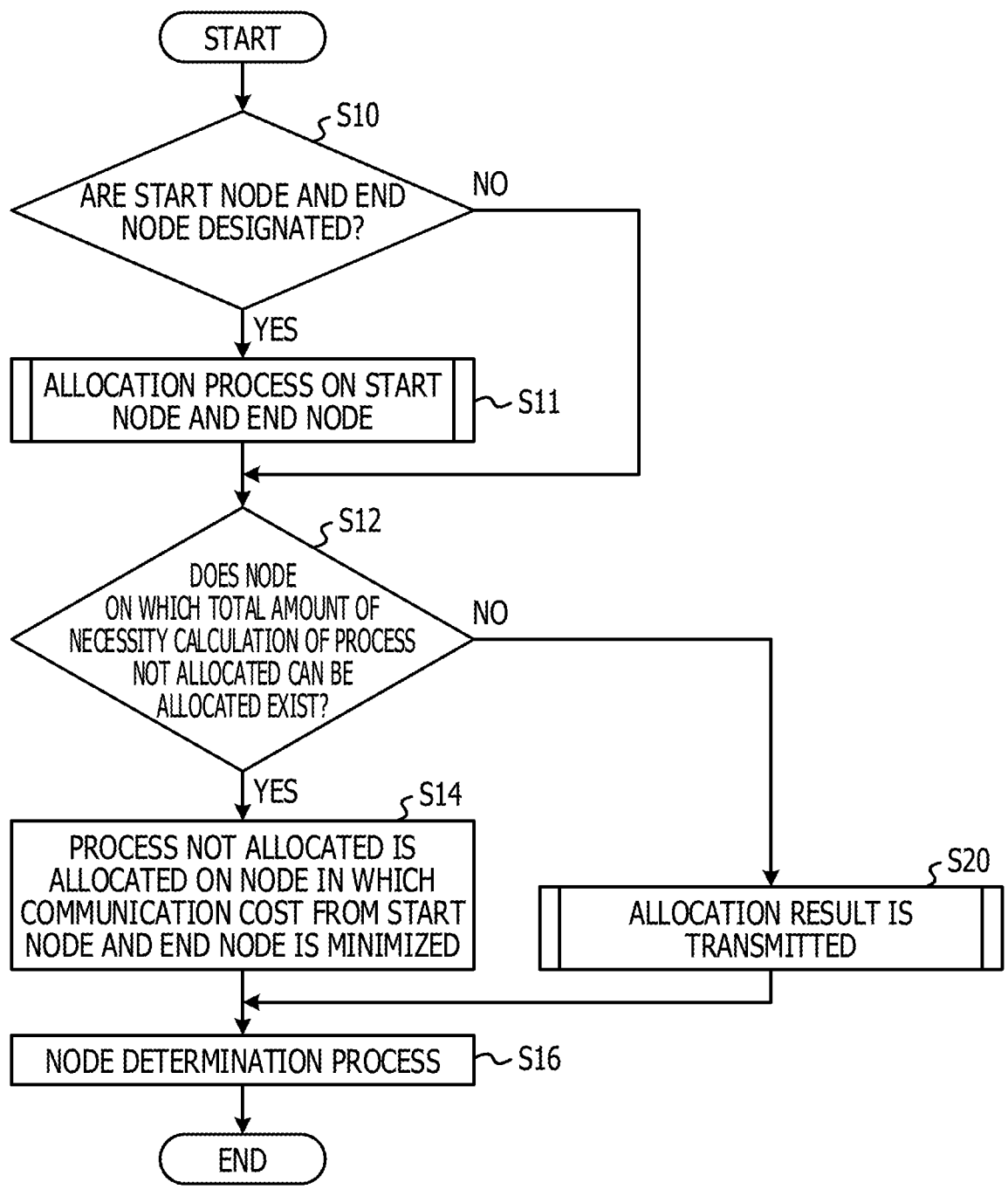
FIG. 7 is a flow chart illustrating an allocation process by the process allocation server.
Figure 9A:
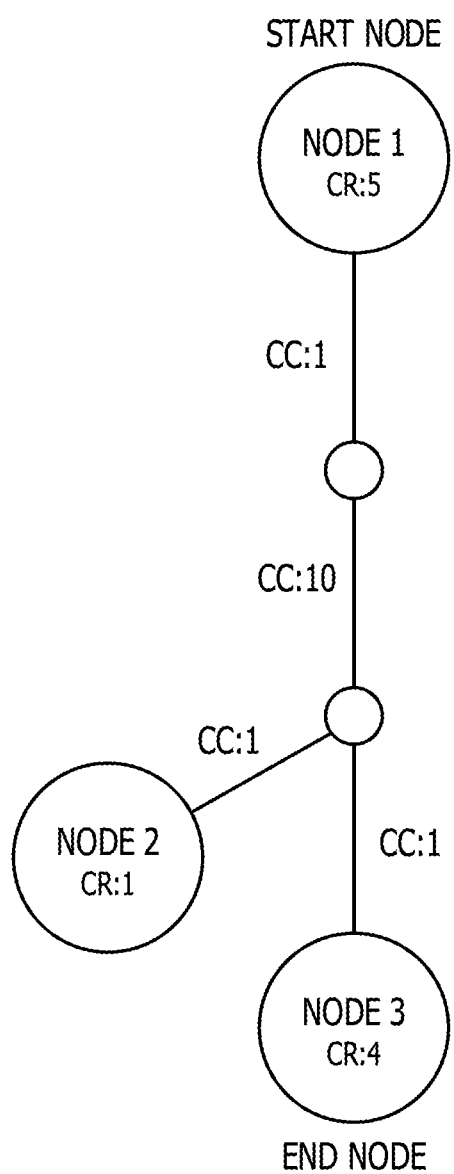

FIG. 7 is a flow chart illustrating the allocation process by the process allocation server 10. The process is a process for allocating each process included in a series of processes on a node, that is, determining a node for performing each process. The process of FIG. 7 is started when the process allocation server 10 receives an allocation request from the process arrangement performance server 20.

In the process of FIG. 7, first, in step S10, the process group creation unit 103 determines whether or not the start node and the end node are designated. In a case where the start node and the end node are not designated, the process proceeds to step S12.

Meanwhile, in a case where the start node and the end node are designated, the process proceeds to step S11, and the process group creation unit 103 starts the allocation process on a start node and an end node of FIG. 8. Here, it is assumed that the process allocation server 10 receives a request for allocating a series of processes illustrated in FIG. 9B on a node, as the start node is a node 1 and the end node is a node 3, in a network illustrated in FIG. 9A. In this case, since the start node and the end node are designated, the determination in step S10 of FIG. 7 is positive, and the process group creation unit 103 proceeds to step S11 and starts the allocation process on the start node and the end node. FIGS. 9A, 9B, 9C, 9D, 9E, and 9F are diagrams for explaining the allocation process.

Allocation Process on Start Node and End Node: S11

FIG. 8 is a flow chart illustrating the details of the allocation process (S11) on the start node and the end node.

In the process of FIG. 8, the process group creation unit 103 searches a series of processes from the first process in step S101, and specifies a process of a range which can be performed in the start node. For example, the process group creation unit 103 specifies a process of which the total amount of necessity calculation is equal to or less than the calculation resource of the start node (total amount of necessity calculation≤calculation resource of start node), including the first process, from a series of processes. In a network illustrated in FIG. 9A, the calculation resource of the node 1 that is a start node is "5". In this case, the process group creation unit 103 specifies that a process from "start" to "process 2" is the process of the range which can be performed in the start node, in a series of processes illustrated in FIG. 9B.

In subsequent step S103, the process group creation unit 103 creates a process group including the first process, based on the process specified in step S101 and a necessity bandwidth between processes. For example, the process group creation unit 103 compares the necessity bandwidth between processes in the process of the range which can be performed in the start node specified in step S101, and the necessity bandwidth between the last process in the process of the range which can be performed in the start node and the process immediately thereafter. Accordingly, if the necessity bandwidth between processes in the process of the range which can be performed in the start node is smaller than the necessity bandwidth in the last process and the process immediately thereafter, the process of the range which can be performed in the start node is divided between processes between which the necessity bandwidth between processes is minimized. If the necessity bandwidth between the last process in the process of the range which can be performed in the start node and the process immediately thereafter is smaller than the necessity bandwidth between processes in the process of the range which can be performed in the start node, a series of processes is divided between the last process in the process of the range which can be performed in the start node and the process immediately thereafter. In FIG. 9B, in the process from "start" to "process 2", a necessity bandwidth of "1" between "process 1" and "process 2" is smaller than a necessity bandwidth "2" between "process 2" that is the last process of the specified process and "process 3" that is the process immediately thereafter. Accordingly, the process group creation unit 103 divides the process from "start" to "process 2" between "process 1" and "process 2" between which the necessity bandwidth is minimized, and creates a process group 1 including "start" that is the first process (see FIG. 9C). With this, the process having a large necessity bandwidth between processes in the range which can be performed in the start node is collectively allocated on the start node.

When creating the process group, the process group creation unit 103, for example, creates a process group allocation management table as illustrated in FIG. 10A. FIGS. 10A, 10B, 10C, 10D, 11A, 11B, 11C, and 11D are diagrams for explaining the allocation process on the start node and the end node. The process group allocation management table is a table for managing on which node a process group is allocated. As illustrated in FIG. 10A, the process group allocation management table includes fields such as a "process group", a "process name", and an "allocation node". The name of a process group created by the process group creation unit 103 is stored in the field of "process group". The information of a process included in a process group is stored in the field of "process name". The information of a node on which a process group is allocated is stored in the field of "allocation node". At the end of step S103, since a process group 1 is not yet allocated on a node, the field of the allocation node is empty, as illustrated in FIG. 10A.

Back to the description of FIG. 8. In step S104, the node determination unit 105 allocates the process group created in step S103 on the start node. In a case of FIG. 9C, the node determination unit 105 allocates the process group 1 on the node 1 that is a start node (see FIG. 9D). At this time, as illustrated in FIG. 10B, the node determination unit 105 stores "node 1" in the field of "allocation node" corresponding to the process group 1 in the process group allocation management table. In addition, the node determination unit 105 updates the resource allocation management table (see FIG. 6A). For example, as illustrated in FIG. 10C, the node determination unit 105 stores "start" and "process 1" that are processes included in the process group 1, in the field of "allocated process" corresponding to the node 1. In addition, the node determination unit 105 stores "3" obtained by subtracting the amount of necessity calculation "2" of "process 1" from the calculation resource of "5", in the field of "remaining calculation resource" corresponding to the node 1. Furthermore, the node determination unit 105 updates the node allocation information table (see FIG. 6B). For example, as illustrated in FIG. 10D, "node 1" is stored in the field of "allocation node" corresponding to each of "start" and "process 1".

Back to the description of FIG. 8. In step S105, the process group creation unit 103 searches a series of processes from the last process, and specifies a process of the range which can be performed in the end node. For example, the process group creation unit 103 specifies a process of which the total amount of necessity calculation is equal to or less than the calculation resource of the end node (total amount of necessity calculation≤calculation resource of end node), including the last process, from a series of processes. In the network illustrated in FIG. 9A, the calculation resource of the node 3 that is an end node is "4". Accordingly, in FIG. 9C, the process group creation unit 103 specifies that a process from "end" to "process 3" is a process of the range which can be performed in the end node.

In subsequent step S107, the process group creation unit 103 creates a process group including the last process based on the process specified in step S105 and the necessity bandwidth between processes. For example, the process group creation unit 103 compares the necessity bandwidth between processes in the process of the range which can be performed in the end node specified in step S105 and the necessity bandwidth between the first process in the process of the range which can be performed in the end node and the process immediately therebefore. Accordingly, in a case where the necessity bandwidth between processes in the process of the range which can be performed in the end node is smaller than the necessity bandwidth between the first process in the process of the range which can be performed in the end node and the process immediately therebefore, the process group creation unit 103 divides the process of the range which can be performed in the end node between processes between which the necessity bandwidth between processes is minimized. Meanwhile, in a case where the necessity bandwidth between the first process in the process of the range which can be performed in the end node and the process immediately therebefore is smaller than the necessity bandwidth between processes in the process of the range which can be performed in the end node, the process group creation unit 103 divides a series of processes between the first process in the process of the range which can be performed in the end node and the process immediately therebefore. In FIG. 9C, in the process from "end" to "process 3", the necessity bandwidth between "process 3" that is the first process and "process 2" that is the process immediately therebefore is "2", and is smaller than the necessity bandwidth of "10" between "process 3" and "end". Accordingly, the process group creation unit 103 divides a process between "process 2" and "process 3", and creates a process group 2 including the last process (see FIG. 9D). With this, the process having a large necessity bandwidth between processes in the range which can be performed in the end node is collectively allocated on the end node. At this time, as illustrated in FIG. 11A, the process group creation unit 103 adds "process group 2" to the process group allocation management table.

In subsequent step S108, the node determination unit 105 allocates the process group created in step S107 on the end node. In FIG. 9D, the node determination unit 105 allocates the process group 2 on the node 3 that is an end node (see FIG. 9E). Accordingly, the node determination unit 105 updates the process group allocation management table, the resource allocation management table, and the node allocation information table, as illustrated in FIGS. 11B, 11C, and 11D, respectively.

After completing a process of step S108, the process proceeds to step S12 of FIG. 7.

When the process proceeds to step S12 of FIG. 7, the node determination unit 105 determines whether or not a node on which the total amount of necessity calculation of a process which is not yet allocated on a node is allocated exists. In FIG. 9E, the amount of necessity calculation of "process 2" which is not yet allocated on a node is "2". In this case, the node determination unit 105 refers to the resource allocation management table of FIG. 11C, and searches for a node on which the amount of necessity calculation of "2" can be allocated. For example, the node determination unit 105 searches for a node in which the remaining calculation resource is equal to or greater than 2. In a case of FIG. 11C, the remaining calculation resource of the node 1 is "3", and the amount of necessity calculation of "process 2" can be allocated on the node 1. In this case, the process of the node determination unit 105 proceeds to step S14.

When proceeding to step S14, the node determination unit 105 allocates a process that is not allocated, on a node in which a communication cost from the start node to the end node is minimized. In a case of FIG. 9E, since a node on which the process 2 can be allocated is only the node 1, "process 2" is allocated on the node 1 (see FIG. 9F). The node determination unit 105 updates the resource allocation management table and the node allocation information table, as illustrated in FIGS. 12A and 12B, respectively. FIGS. 12A, 12B, 13A, 13B, 13C, 13D, 13E, 13F, and 14 are diagrams for explaining step S14 of the allocation process. In a case where a plurality of nodes capable of performing a process not allocated exist without designating the start node and the end node, the node determination unit 105 may determine a node on which a process is allocated, based on a predetermined rule. For example, the node determination unit 105 may allocate a process on a node having the smallest node number among the plurality of nodes on which a process not allocated can be allocated, or may allocate the process on a node having the greatest node number among the plurality of nodes.

Figure 13A:
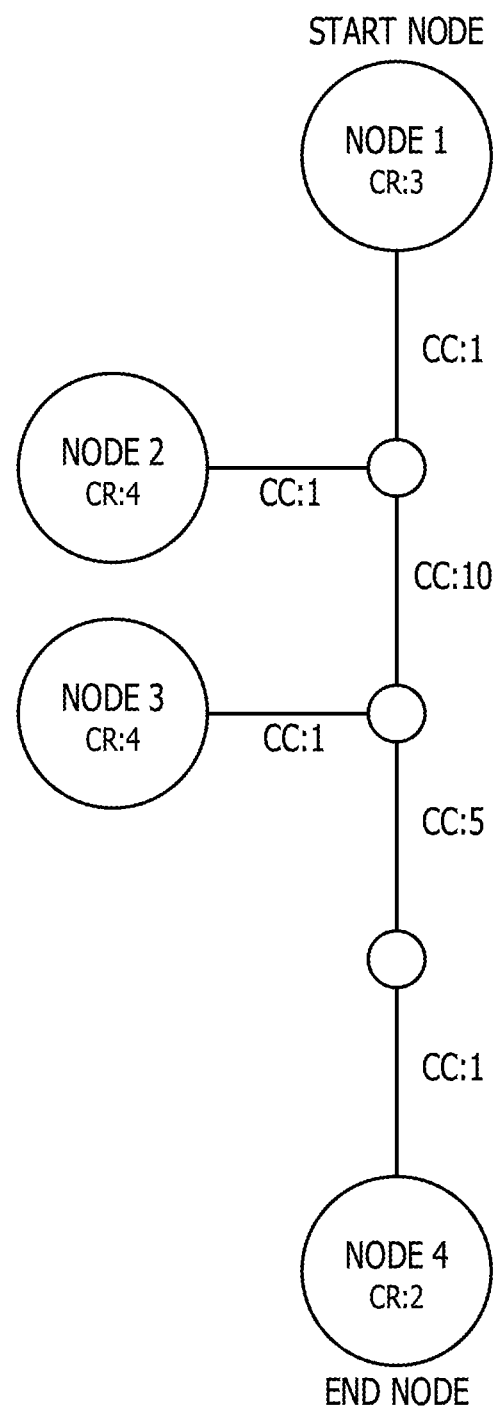

As another example, a case where the process allocation server 10 receives a request for allocating a series of processes illustrated in FIG. 13B on a node, as a start node is a node 1 and an end node is a node 4 in a network illustrated in FIG. 13A, will be described.

Since the calculation resource of the node 1 that is the start node is "3", a process from "start" to "process 1" can be performed (FIG. 8: step S103). Here, in a process from "start" to "process 1", the necessity bandwidth between "start" and "process 1" is "10", and is greater than the necessity bandwidth of "1" between "process 1" and "process 2". In this case, the process group creation unit 103 divides a series of processes between "process 1" and "process 2", and creates a process group 1 including "start" that is the first process (see FIG. 8: step S103 and FIG. 13C). Accordingly, the node determination unit 105 allocates the process group 1 on the node 1 that is the start node (see FIG. 8: step S104 and FIG. 13D).

Meanwhile, since the calculation resource of the node 4 that is an end node is "2", a process from "end" to "process 4" can be performed (FIG. 8: step S105). Here, the necessity bandwidth between "process 4" that is the first process in a direction from "end" to "start" and "process 3" that is a process immediately before "process 4" in a direction from "start" to "end" is "2", and is smaller than the necessity bandwidth of "5" between processes in a process from "end" to "process 4". In this case, the process group creation unit 103 divides a series of processes between "process 3" and "process 4", and creates a process group 2 including "end" that is the last process (see FIG. 8: step S107 and FIG. 13D). Accordingly, the node determination unit 105 allocates the process group 2 on the node 4 that is an end node (see FIG. 8: step S108 and FIG. 13E).

The resource allocation management table is configured as illustrated in FIG. 14 at a time when the allocation of a process on the start node and the end node is completed. The total amount of necessity calculation of "process 2" and "process 3" not allocated on nodes is "4", and a plurality of nodes (node 2 and node 3) capable of performing the entirety of "process 2" and "process 3" exist when referring to FIG. 14. In this case, the node determination unit 105 compares a communication cost in a case where "process 2" and "process 3" are allocated on the node 2 and a communication cost in a case where "process 2" and "process 3" are allocated on the node 3, and allocates "process 2" and "process 3" on a node in which the communication cost is minimized (FIG. 7: step S14). Here, the communication cost between nodes of the node 1 on which a process is allocated and the node 2 is "2", and the communication cost between nodes of the node 4 on which a process is allocated and the node 2 is "17". Accordingly, the total communication cost in a case of allocating "process 2" and "process 3" on the node 2 is "36" (2×1+17×2). Meanwhile, since the communication cost between nodes of the node 3 and the node 1 is "12", and the communication cost between nodes of the node 3 and the node 4 is "7", the total communication cost in a case of allocating "process 2" and "process 3" on the node 3 is "26" (12×1+7×2). Accordingly, the node determination unit 105 allocates "process 2" and "process 3" on the node 3 in which the total communication cost is minimized (see FIG. 13F).

Back to the description of FIG. 7. In step S12, in a case where a node on which the total amount of necessity calculation of a process not allocated can be allocated does not exist, the node determination unit 105 proceeds to step S20, and starts a node determination process illustrated in FIG. 15. FIGS. 16A, 16B, 16C, 16D, 16E, 16F, 17A, 17B, 17C, 18A, 18B, and 18C are diagrams for explaining the node determination process. Here, as an example, a case where the process allocation server 10 receives a request for allocating a series of processes illustrated in FIG. 16B on a node, as the start node is the node 1 and the end node is the node 4, in the network illustrated in FIG. 16A, will be described. In this case, when the allocation process on the start node and the end node of step S11 of FIG. 7 is performed, the process group 1 including the first process of "start" is allocated on the node 1 that is the start node. In addition, the process group 2 including the last process of "end" is allocated on the node 4 that is the end node (FIG. 16C). The resource allocation management table after a process of step S11 is configured as FIG. 17A. In addition, the process group allocation management table is configured as FIG. 17B. Since the calculation resource of the node 1 that is the start node is "1" and "process 1" of which the amount of necessity calculation is "2" may not be performed, only "start" is allocated on the node 1. Here, in FIG. 16C, since the total amount of necessity calculation of "process 1" to "process 3" that are processes not allocated on nodes is "8" and a node on which allocation can be performed does not exist, the determination of step S12 is negative, the node determination unit 105 proceeds to step S20, and the node determination process of FIG. 15 starts.

Node Determination Process: S20

Figure 15:
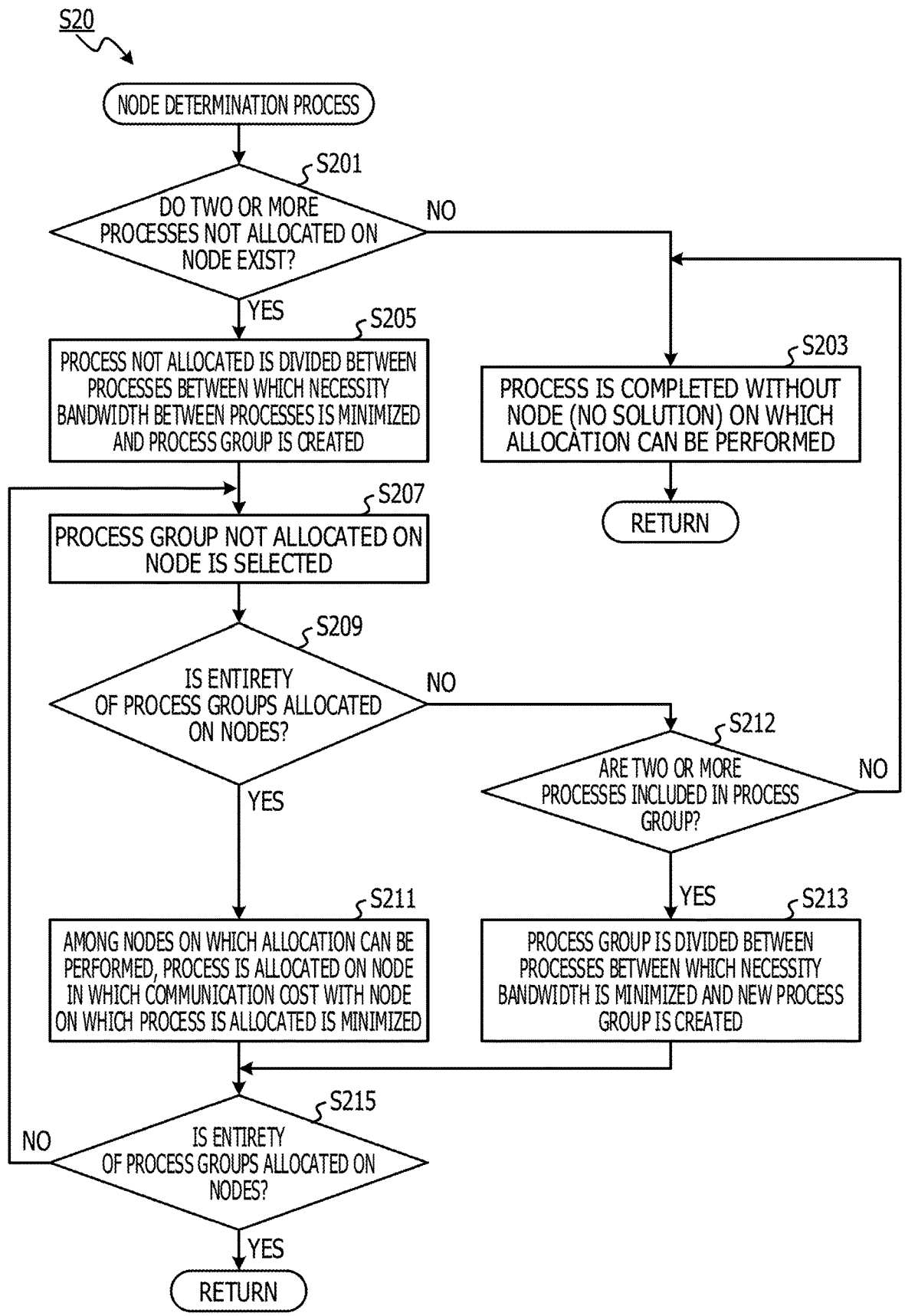
FIG. 15 is a flow chart illustrating the details of a node determination process.
Figure 16A:
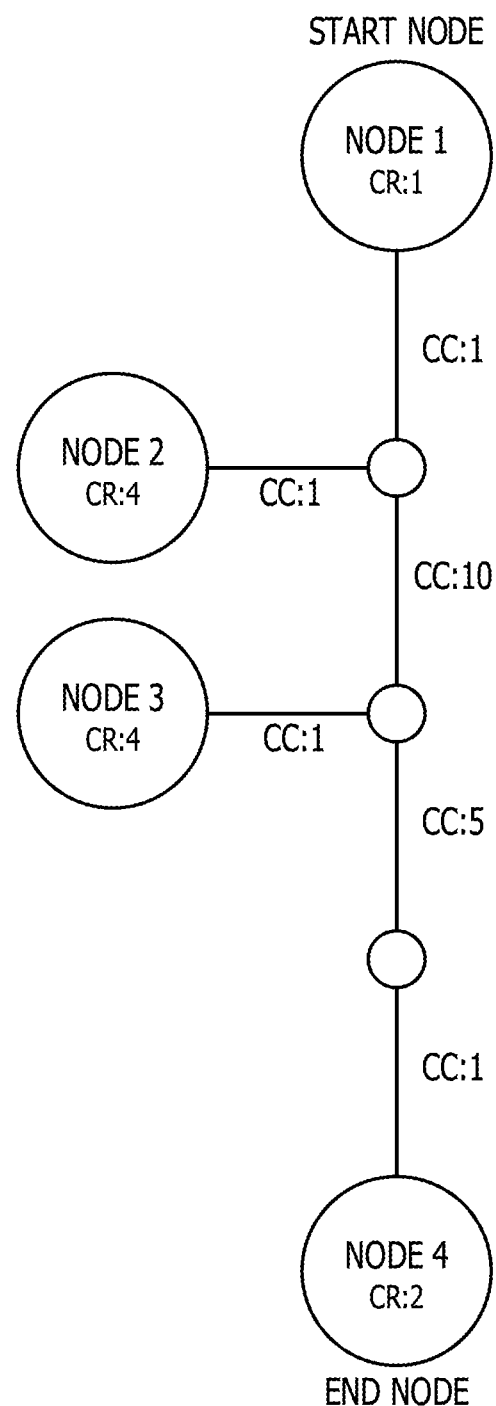

FIG. 15 is a flow chart illustrating the details of the node determination process.

In the process of FIG. 15, first, in step S201, the node determination unit 105 determines whether or not two or more processes not allocated on a node exist. In a case where the determination is negative, the process proceeds to step S203, the node determination unit 105 completes the process without a node (no solution) on which a process can be allocated, and the process proceeds to step S16 of FIG. 7.

Meanwhile, in a case where two or more processes not allocated on a node exist, the process proceeds to step S205, and the process group creation unit 103 divides the processes not allocated between processes between which the necessity bandwidth between processes is minimized, and creates a process group. In FIG. 16C, the necessity bandwidth between "process 1" and "process 2" is minimized as "1", in "process 1" to "process 3" which are not allocated. Accordingly, the process group creation unit 103 divides "process 1" to "process 3" not allocated between "process 1" and "process 2", and creates a process group 3 and a process group 4 (see FIG. 16D). At this time, the process group creation unit 103 adds the process group 3 and the process group 4 as illustrated in FIG. 17C to the process group allocation management table illustrated in FIG. 17B.

In subsequent step S207, the node determination unit 105 selects a process group not allocated on a node. For example, the node determination unit 105 selects the process group 3 not allocated on a node, in the process group allocation management table illustrated in FIG. 17C.

In subsequent step S209, the node determination unit 105 determines whether or not a node on which the sum of the amount of necessity calculation (total amount of necessity calculation) of each process included in the selected process group can be allocated exists. In this process, it is determined whether or not a node capable of performing the entirety of processes included in the process group exists. Here, in a case where the determination is positive, the process proceeds to step S211.

When proceeding to step S211, the node determination unit 105 allocates a process group on a node in which the communication cost with a node on which a process is allocated is minimized, among nodes on which allocation can be performed. For example, in FIG. 16D, the amount of necessity calculation of "process 1" included in the process group 3 is "2", and a process can be allocated on the node 2 and the node 3 when referring to the resource allocation management table of FIG. 17A. In this case, the node determination unit 105 allocates the process group 3 on the node 2 in which a communication cost with a node (start node: node 1) on which a process is allocated is minimized. The node determination unit 105 updates the process group allocation management table as illustrated in FIG. 18A. In addition, the node determination unit 105 updates the resource allocation management table as illustrated in FIG. 18B.

In subsequent step S215, the node determination unit 105 determines whether or not the entirety of process groups is allocated on nodes. For example, the node determination unit 105 determines whether or not a process group not allocated on a node exists, in the process group allocation management table (FIG. 18A or the like). Here, in a case where the determination is positive, the process of FIG. 15 is completed and proceeds to step S16 of FIG. 7.

Meanwhile, in a case where a process group not allocated on the node exists, the determination of step S215 is negative, the process of the node determination unit 105 returns to step S207, and selects a process group that is not allocated on a node. In the process group allocation management table of FIG. 18A, since the process group 4 is not yet allocated on a node, the node determination unit 105 selects the process group 4.

Here, when the sum of the amount of necessity calculation of the process 2 and the process 3 included in the process group 4 is "5" and the resource allocation management table of FIG. 18B is referred to, a node on which allocation can be performed does not exist. In this case, the determination of step S209 is negative, and the process proceeds to step S212.

When proceeding to step S212, the node determination unit 105 determines whether or not two or more processes are included in the process group. In a case where the determination is negative, the process proceeds to step S203, is completed without a node (no solution) on which a process can be allocated, and proceeds to step S16 of FIG. 7. Meanwhile, in a case where two or more processes are included in the process group, the process proceeds to step S213.

When proceeding to step S213, the process group creation unit 103 divides a process within the process group between processes between which the necessity bandwidth between processes is minimized, and creates a new process group. For example, in FIG. 16D, the process group creation unit 103 divides the process group 4 between "process 2" and "process 3" between which the necessity bandwidth is minimized, and newly creates a process group 4-1 and a process group 4-2 (see FIG. 16E). At this time, the process group creation unit 103 deletes the process group 4 from the process group allocation management table of FIG. 18A, and adds the process group 4-1 and the process group 4-2, as illustrated in FIG. 18C.

In subsequent step S215, the node determination unit 105 determines whether or not the entirety of process groups is allocated on a node. The process group creation unit 103 and the node determination unit 105 repeat the processes of step S207 to step S213, until the determination of step S215 is positive, that is, until the entirety of process groups is allocated on a node. That is, in step S207 to step S215, the division of a series of processes is repeated until a process group which can be processed in a node is configured. Accordingly, at a time when the entirety of process groups is allocated on a node, the determination of step S215 is positive, and the process of FIG. 15 is completed and proceeds to step S16 of FIG. 7.

Figure 16E:
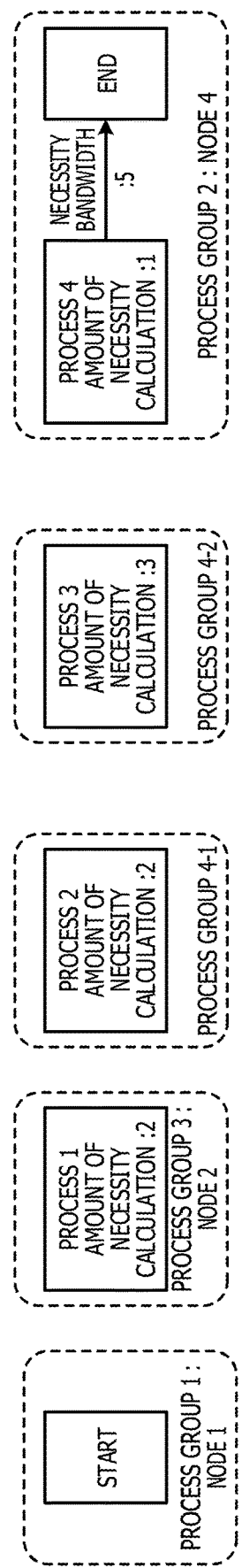
Figure 16F:
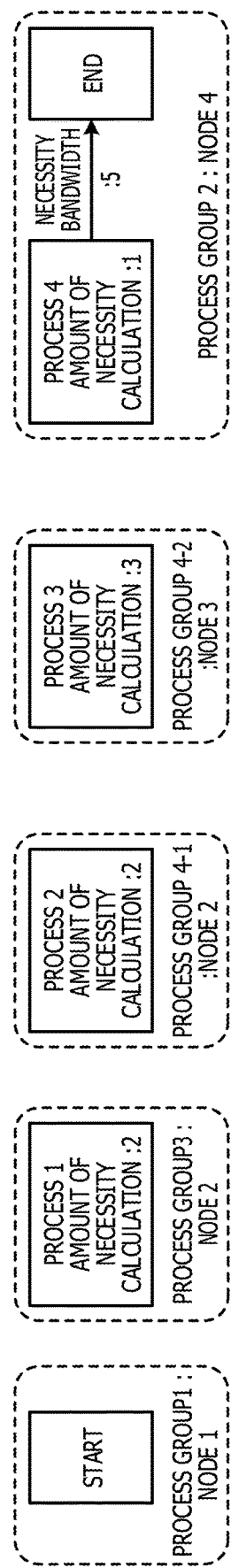
Figure 19A:
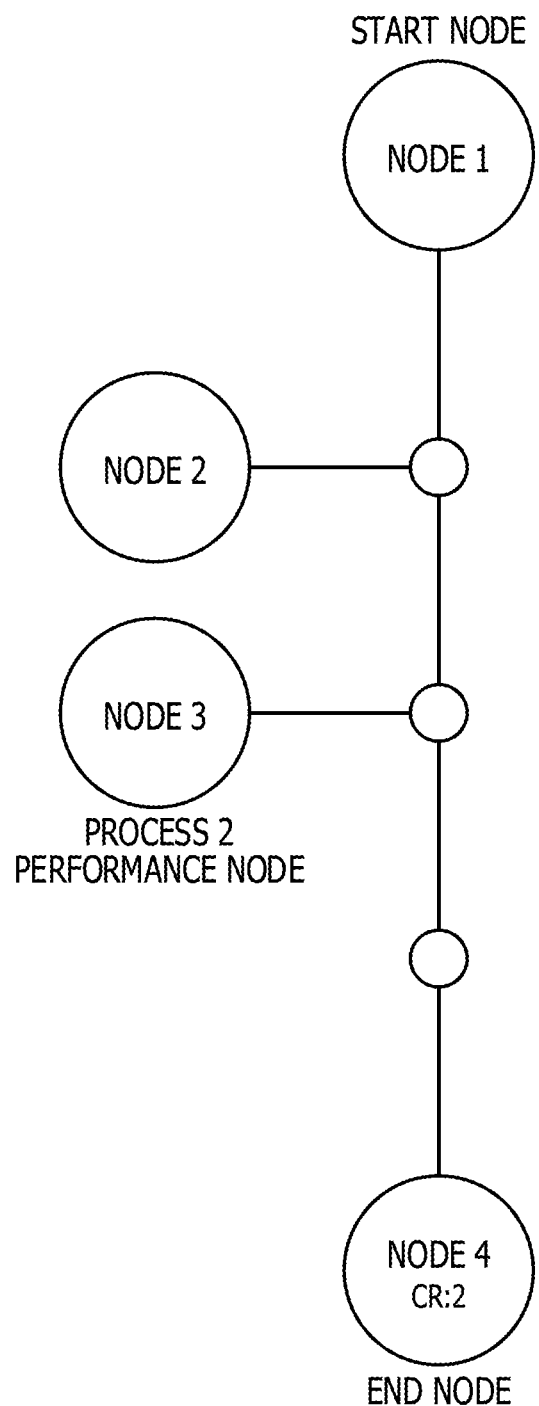
FIGS. 19A, 19B, 19C, and 19D are diagrams for explaining the allocation process in a case where a node for performing a specific process is designated.
Figure 19B:
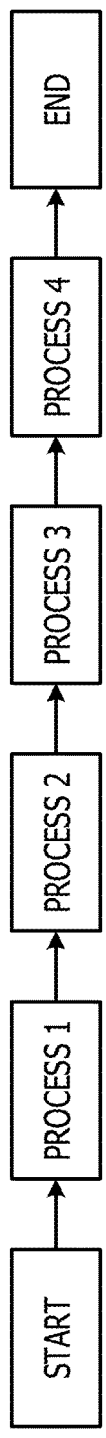
Figure 19C:
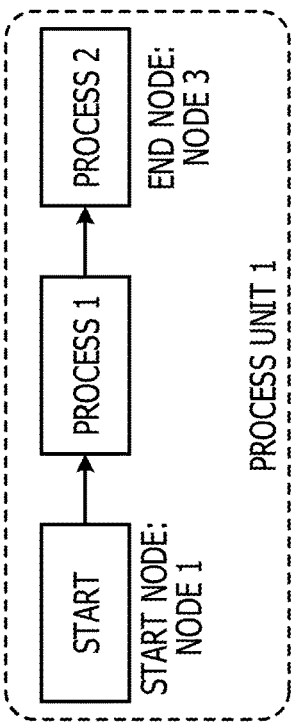
Figure 19D:
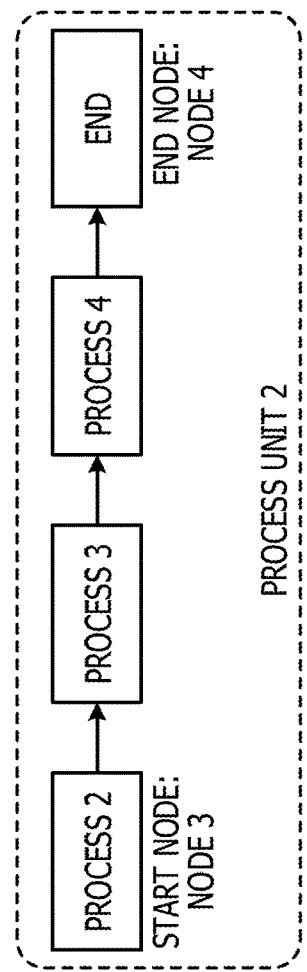

In FIG. 16E, the process group 4-1 including "process 2" can be allocated on the node 2 and the node 3 (see FIG. 18B). However, the node determination unit 105 allocates the process group 4-1 on the node 2 in which a communication cost with the node 2 that is a node on which "process 1" is allocated is minimized (see FIG. 16F). In addition, since the process group 4-2 including the process 3 can be allocated on the node 3, the node determination unit 105 allocates the process group 4-2 on the node 3 (see FIG. 16F). Accordingly, when the node determination unit 105 completes the allocation of the process group 4-2 on a node, since the allocation of the entirety of process groups on nodes is completed, the process proceeds to step S16 of FIG. 7.

Back to the description of FIG. 7. When proceeding to step S16, the information output unit 107 transmits an allocation result of each process on a node to the process arrangement performance server 20, and completes the entirety of processes of FIG. 7. For example, the information output unit 107 transmits the information of the node allocation information table (see FIG. 12B) to the process arrangement performance server 20. The process arrangement performance server 20 arranges each process in a node based on the information of the node allocation information table, and starts a series of processes.

As described above in detail, according to this embodiment, in the process allocation server 10, the process group creation unit 103 divides (FIG. 8: steps S101, S103, S105, and S107, FIG. 15: step S205, and FIG. 16D) a series of processes including a plurality of associated processes into a process group including at least one process, based on a bandwidth desired for data communication between processes, the node determination unit 105 specifies a node which can perform the entirety of processes included in each process group after division for every process group among a plurality of nodes coupled to a network, and allocates each process group on the specified node (FIG. 8: steps S104 and S108, and FIG. 15: step S211). With this, since each process is allocated on a node by considering the bandwidth desired for data communication between processes, the amount of communication data between nodes is reduced and a network load is reduced in a case where a series of processes is performed in a distributed manner in a plurality of nodes.

For example, in this embodiment, the process group creation unit 103 causes a process having a large bandwidth desired for data communication between processes to be included in the same process group with priority. With this, since the process having the large necessity bandwidth between processes is collectively allocated on one node, the amount of communication data between nodes for performing each process is reduced. Accordingly, a network load is reduced in a case where a series of processes is performed in a distributed manner in a plurality of nodes.

For example, in this embodiment, the process group creation unit 103 divides a series of processes between processes between which the bandwidth desired for data communication between processes is minimized. With this, since a process having a large necessity bandwidth between processes is collectively allocated on one node and the necessity bandwidth between processes allocated on other nodes is small, the amount of communication data between nodes performing each process is reduced. Accordingly, a network load is reduced in a case where a series of processes is performed in a distributed manner in a plurality of nodes.

In addition, in this embodiment, the process group creation unit 103 divides the process group between which the bandwidth desired for data communication between processes included in the process group is minimized, and creates a new process group, in a case where there is no node which can perform the entirety of processes included in a process group after division (FIG. 15: step S213 and FIG. 16E). With this, the process having the large necessity bandwidth between processes is collectively allocated on one node of a range which can be performed in a node on a network.

In addition, in this embodiment, in a case where a start node for starting a series of processes is determined, the process group creation unit 103 divides a process group including the first process of a series of processes, based on the calculation resource of the start node and a bandwidth desired for data communication between processes (FIG. 8: steps S101 and S103, and FIG. 9C). The node determination unit 105 allocates a process group including the first process on the start node (FIG. 8: step S104 and FIG. 9D). In addition, in a case where an end node for completing a series of processes is determined, the process group creation unit 103 divides a process group including the last process of a series of processes, based on the calculation resource of the start node and a bandwidth desired for data communication between processes (FIG. 8: steps S105 and S107, and FIG. 9D). The node determination unit 105 allocates a process group including the last process on the end node (FIG. 8: step S108 and FIG. 9F). With this, a series of processes starts at the start node and completes at the end node, and the process having the large necessity bandwidth between processes is collectively allocated on one node.

In addition, in this embodiment, the node determination unit 105 determines a node on which a process group is allocated based on a communication cost with the node on which a process is allocated, in a case where a plurality of nodes which can perform the entirety of processes included in the process group exist (FIG. 7: step S14 and FIG. 15: step S211). For example, the node determination unit 105 allocates a process group on a node in which the communication cost with the node on which a process is allocated is minimized. With this, in a case where a series of processes is performed in a distributed manner in a plurality of nodes, a network load is reduced, and a communication cost is reduced.

In the above embodiment, the process group creation unit 103 divides a series of processes between processes between which the bandwidth desired for data communication between processes is minimized. However, the disclosure is not limited thereto. For example, the process group creation unit 103 may divide a series of processes between processes in which the bandwidth desired for data communication between processes is equal to or less than a predetermined bandwidth (for example, 5). Even in this case, a process in which the necessity bandwidth between processes is equal to or greater than a predetermined bandwidth is collectively allocated on one node, the amount of communication data between nodes is reduced, and a network load is reduced.

In the above embodiment, the start node and the end node are designated. However, there is a case where a node for performing a specific process included in a series of processes is designated. FIGS. 19A, 19B, 19C, and 19D are diagrams for explaining the allocation process in a case where a node for performing a specific process is designated. For example, it is assumed that the process allocation server 10 receives a request for allocating a series of processes illustrated in FIG. 19B on nodes, in a network illustrated in FIG. 19A. At this time, it is assumed that the node 1 is designated as the start node, the node 4 is designated as the end node, and "process 2" is designated to be performed at the node 3. In this case, the process allocation server 10 divides a series of processes illustrated in FIG. 19B into a process unit 1 (FIG. 19C) including a process from "start" to "process 2" and into a process unit 2 (FIG. 19D) including a process from "process 2" to "end". Accordingly, the process allocation server 10 performs the allocation process (FIG. 7) corresponding to the process unit 1 as the start node is the node 1 and the end node is the node 3, and performs the allocation process (FIG. 7) corresponding to the process unit 2 as the start node is the node 3 and the end node is the node 4. With this, a specific process is performed at the designated node and the process having the large necessity bandwidth between processes is collectively allocated on one node.

The above process function is realized by a computer. In this case, a program in which process content of a function of a process device is described is provided. By executing the program in the computer, the process function is realized on the computer. The program in which the process content is described is recorded in a recording medium (however, carrier is excluded) capable of being read in the computer.

In a case where the program is distributed on the market, for example, the program is sold as a portable recording medium such as a digital versatile disc (DVD), a compact disc read only memory (CD-ROM), and the like in which the program is recorded. In addition, the program is stored in a storage device of a server computer, and then the program may be transmitted from the server computer to another computer through a network.

For example, the computer for performing the program stores the program recorded in the portable recording medium or the program transmitted from the server computer, in a storage device thereof. Accordingly, the computer reads the program from the storage device thereof and performs a process according to the program. The computer may perform a process according to the program by directly reading the program from the portable recording medium. In addition, the computer may sequentially perform a process according to the received program whenever the program is transmitted from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of allocating a plurality of processes on a plurality of node devices coupled through a network, the method comprising:
   determining, by a processor, whether or not a start node device at which a process to be performed first in the plurality of processes and an end node device at which a process to be performed finally in the plurality of processes are designated in the plurality of node devices;
   specifying, when determining that the start node device is not designated, first processes which are included in the plurality of processes, the process to be performed first being included in the first processes, the first processes having a total calculation amount which indicates a calculation amount to perform the first processes and is equal to or less than a calculation resource at the start node device;
   comparing a first bandwidth used for data communication among the first processes with a second bandwidth used for data communication between a final process which is to be performed finally in the first processes and a next process which is not included in the first processes and is to be performed after the final process;
   dividing, when the first bandwidth is smaller than the second bandwidth, the first processes into the final process and one or more first processes other than the final process; and
   allocating the one or more first processes on the start node device.

2. The method according to claim 1, further comprising:
   allocating, when the first bandwidth is larger than the second bandwidth, the first processes on the start node device.

3. The method according to claim 1, further comprising:
   specifying second processes which are included in the plurality of processes, the process to be performed finally being included in the second processes, the second processes having a total calculation amount which indicates a calculation amount to perform the second processes and is equal to or less than a calculation resource at the end node device;
   comparing a third bandwidth used for data communication among the second processes with a fourth bandwidth used for data communication between a leading process of the second processes and a previous process prior to the leading process; and
   allocating, when the fourth bandwidth is smaller than the third bandwidth, the second processes on the end node device.

4. The method according to claim 3, further comprising:
   dividing, when the fourth bandwidth is larger than the third bandwidth, the second processes into the leading process and one or more second processes other than the leading process.

5. The method according to claim 3, further comprising:
   searching, when there is a process which is not allocated to one of the plurality of node devices, a node device having a calculation resource which is equal to or larger than a calculation amount of the process; and
   allocating the process on the searched node device.

6. The method according to claim 4, further comprising:
   searching, when there is a process which is not allocated to one of the plurality of node devices, a node device having a remaining calculation resource which is equal to or larger than a calculation amount of the process; and
   allocating the process on the searched node device.

7. The method according to claim 3, further comprising:
   comparing, when node devices having the remaining calculation resource which is equal to or larger than the calculation amount of the process are searched as the searched node device, communication costs when the processes are allocated to each of the searched node devices with each other; and
   allocating the process on one of the searched node devices having a minimum communication cost.

8. The method according to claim 4, further comprising:
   comparing, when node devices having the remaining calculation resource which is equal to or larger than the calculation amount of the process are searched as the searched node device, communication costs when the processes are allocated to each of the searched node devices with each other; and
   allocating the process on one of the searched node devices having a minimum communication cost.

9. The method according to claim 1, wherein the plurality of processes are a series of associated process groups.

10. An apparatus configured to allocate a plurality of processes on a plurality of node devices coupled through a network, the apparatus comprising:
   a memory; and
   a processor coupled to the memory and configured to:
      determine whether or not start node device at which a process to be performed first in the plurality of processes and an end node device at which a process to be performed finally in the plurality of processes are designated in the plurality of node devices;
      specify, when determining that the start node device is not designated, first processes which are included in the plurality of processes, the process to be performed first being included in the first processes, the first processes having a total calculation amount which is equal to or less than a calculation resource at the start node device;
compare a first bandwidth used for data communication among the first processes with a second bandwidth used for data communication between a final process which is to be performed finally in the first processes and a next process which is not included in the first processes and is to be performed after the final process;
divide, when the first bandwidth is smaller than the second bandwidth, the first processes into the final process and one or more first processes other than the final process, and
allocate the one or more first processes on the start node device.

11. A non-transitory storage medium storing a program for causing a computer to execute a process for allocating a plurality of processes on a plurality of node devices coupled through a network, the process comprising:
determining whether or not a start node device at which a process to be performed first in the plurality of processes and an end node device at which a process to be performed finally in the plurality of processes are designated in the plurality of node devices;
specifying, when determining that the start node device is not designated, first processes which are included in the plurality of processes, the process to be performed first being included in the first processes, the first processes having a total calculation amount which is equal to or less than a calculation resource at the start node device;
comparing a first bandwidth used for data communication among the first processes with a second bandwidth used for data communication between a final process which is to be performed finally in the first processes and a next process which is not included in the first processes and is to be performed after the final process;
dividing, when the first bandwidth is smaller than the second bandwidth, the first processes into the final process and one or more first processes other than the final process; and
allocating the one or more first processes on the start node device.

12. The non-transitory storage medium according to claim 11, wherein the process further comprises:
specifying, when the first bandwidth is larger than the second bandwidth, the one or more first processes on the start node device.

13. The non-transitory storage medium according to claim 11, wherein the process further comprises:
specifying second processes which are included in the plurality of processes, the process to be performed finally being included in the second processes, the second processes having a total calculation amount which indicates a calculation amount to perform the second processes and is equal to or less than a calculation resource at the end node device;
comparing a third bandwidth used for data communication among the second processes with a fourth bandwidth used for data communication between a leading process of the second processes and a previous process prior to the leading process; and
allocating, when the fourth bandwidth is smaller than the third bandwidth, the second processes on the end node device.

14. The non-transitory storage medium according to claim 13, wherein the process further comprises:
dividing, when the fourth bandwidth is larger than the third bandwidth, the second processes into the leading process and one or more second processes other than the leading process.

15. The non-transitory storage medium according to claim 13, wherein the process further comprises:
searching, when there is a process which is not allocated to one of the plurality of node devices, a node device having a calculation resource which is equal to or larger than a calculation amount of the process; and
allocating the process on the searched node device.

16. The non-transitory storage medium according to claim 14, wherein the process further comprises:
searching, when there is a process which is not allocated to one of the plurality of node devices, a node device having a remaining calculation resource which is equal to or larger than a calculation amount of the process; and
allocating the process on the searched node device.

17. The non-transitory storage medium according to claim 13, wherein the process further comprises:
comparing, when node devices having the remaining calculation resource which is equal to or larger than the calculation amount of the process are searched as the searched node device, communication costs when the processes are allocated to each of the searched node devices with each other; and
allocating the process on one of the searched node devices having a minimum communication cost.

18. The non-transitory storage medium according to claim 14, wherein the process further comprises,
comparing, when node devices having the remaining calculation resource which is equal to or larger than the calculation amount of the process are searched as the searched node device, communication costs when the processes are allocated to each of the searched node devices with each other; and
allocating the process on one of the searched node devices having a minimum communication cost.

19. The non-transitory storage medium according to claim 11, wherein the plurality of processes are a series of associated process groups.

* * * * *